(12) United States Patent
Hao et al.

(10) Patent No.: US 11,461,203 B2
(45) Date of Patent: Oct. 4, 2022

(54) SYSTEMS AND METHODS OF HANDLING NODE FAILURE IN A DISTRIBUTED DATA STORAGE USING MULTI-LAYER CONSISTENT HASHING

(71) Applicant: HERE DATA TECHNOLOGY, Guangdong (CN)

(72) Inventors: Bin Hao, Guangdong (CN); Jian Zhu, Guangdong (CN); Jingyao Zhang, Guangdong (CN)

(73) Assignee: HERE DATA TECHNOLOGY, Shenzhen (CN)

(*) Notice: Subject to any disclaimer, the term of this patent is extended or adjusted under 35 U.S.C. 154(b) by 128 days.

(21) Appl. No.: 17/059,468

(22) PCT Filed: Jul. 10, 2018

(86) PCT No.: PCT/CN2018/095083
§ 371 (c)(1),
(2) Date: Nov. 30, 2020

(87) PCT Pub. No.: WO2020/010503
PCT Pub. Date: Jan. 16, 2020

(65) Prior Publication Data
US 2021/0208987 A1 Jul. 8, 2021

(51) Int. Cl.
*G06F 11/20* (2006.01)
*G06F 3/06* (2006.01)

(52) U.S. Cl.
CPC ........ *G06F 11/2094* (2013.01); *G06F 3/0617* (2013.01); *G06F 3/0647* (2013.01); *G06F 3/0673* (2013.01)

(58) Field of Classification Search
CPC .. G06F 11/2094; G06F 3/0617; G06F 3/0647; G06F 3/0673
See application file for complete search history.

(56) References Cited

U.S. PATENT DOCUMENTS 9,697,226 B1 * 7/2017 Youngworth ........... G06F 3/067
9,852,151 B1 * 12/2017 Youngworth ......... G06F 3/0619
(Continued)

FOREIGN PATENT DOCUMENTS

| CN | 102904948 A | 1/2013 |
| CN | 103929500 A | 7/2014 |

(Continued)

OTHER PUBLICATIONS

Written Opinion of PCT Patent Application No. PCT/CN2018/095083 dated Dec. 29, 2018 (Year: 2018).*

(Continued)

*Primary Examiner* — Matthew M Kim
*Assistant Examiner* — Indranil Chowdhury

(57) ABSTRACT

Disclosed is a systems and methods of distributed data storage using multi-layers consistent hashing comprising: a plurality of storage nodes providing data storage and redundancy protection; a plurality of management nodes maintaining the properties of the storage nodes and mapping information from virtual groups to storage nodes; a plurality of monitor nodes maintaining the state of storage nodes and handling the changes of states of storage nodes including joining, decommissioning and failure; and one or more clients providing entries for applications or users to access the storage system. The storage nodes is in a hierarchical tree arrangement, and each storage node in each layer of the tree is allocated with a plurality of identities and configured for remaining hash space with consistency. Instead of sharing one hash space among all storage nodes, there are a plurality of hash spaces kept consistent in each layer of the storage hierarchical tree.

19 Claims, 10 Drawing Sheets

(56) References Cited

U.S. PATENT DOCUMENTS

| | | | |
|---|---|---|---|
| 11,360,938 B2* | 6/2022 | Gheith | G06F 16/152 |
| 2004/0044744 A1* | 3/2004 | Grosner | H04L 67/1019 |
| | | | 709/217 |
| 2007/0156842 A1* | 7/2007 | Vermeulen | H04L 67/01 |
| | | | 709/217 |
| 2012/0089778 A1* | 4/2012 | Au | G06F 3/0631 |
| | | | 711/E12.019 |
| 2013/0339567 A1* | 12/2013 | Carpentier | G06F 12/1009 |
| | | | 711/E12.059 |
| 2014/0330785 A1* | 11/2014 | Isherwood | G06F 11/1435 |
| | | | 707/640 |
| 2018/0095855 A1* | 4/2018 | Sanakkayala | G06F 11/3006 |
| 2021/0216245 A1* | 7/2021 | Hao | G06F 3/067 |
| 2022/0164114 A1* | 5/2022 | Kumarasamy | G06F 16/2365 |
| 2022/0188288 A1* | 6/2022 | Dereszynski | G06F 16/178 |
| 2022/0222155 A1* | 7/2022 | Kamran | G06F 11/1425 |

FOREIGN PATENT DOCUMENTS

| | | | | |
|---|---|---|---|---|
| CN | 110169040 A | * | 8/2019 | G06F 11/2094 |
| CN | 110737668 B | * | 12/2020 | G06F 16/2255 |
| CN | 110169040 B | * | 9/2021 | G06F 11/2094 |
| CN | 109597567 B | * | 3/2022 | G06F 3/061 |
| CN | 114816225 A | * | 7/2022 | G06F 3/06 |
| WO | WO-2011137189 A1 | * | 11/2011 | G06F 16/22 |
| WO | WO-2021042923 A1 | * | 3/2021 | G06F 16/22 |

OTHER PUBLICATIONS

International Search Report of PCT Patent Application No. PCT/CN2018/095083 dated Dec. 29, 2018.

* cited by examiner

| VG_ID | Qualified Nodes List | |
|---|---|---|
| | Primary Node (PN) | Secondary Nodes (SN) |
| VG 0 | SN2 | SN4; SN6 |
| VG 1 | SN1 | SN3; SN5 |
| ... | ... | ... |
| VG VG_NUMBER-1 | SN7 | SN9; SN11 |

FIG. 5

| VG ID | Host Node | Replacement Node |
|---|---|---|
| VG 2 | SN2 | SN4 |
| VG 1 | SN1 | SN3 |
| ... | ... | ... |

SYSTEMS AND METHODS OF HANDLING NODE FAILURE IN A DISTRIBUTED DATA STORAGE USING MULTI-LAYER CONSISTENT HASHING

TECHNICAL FIELD

The present disclosure relates to distributed storage systems, and in particular, to distributed data storage systems with fault tolerance and automatic load balance.

BACKGROUND

A distributed storage system stores data on a plurality of independent devices in a distributed manner. Traditional network storage systems mostly use centralized storage servers to store all data; therefore storage servers have become a bottleneck in system performance, also a focus when concerning about reliability and security, failing to meet the requirements of large-scale storage applications. The distributed network storage system adopts a scalable arrangement, uses multiple storage servers to share storage load and a location server to locate the stored information; thereby enhancing the reliability, availability, and access efficiency of the system to a certain extent. However, there are still the following problems in it.

The distributed storage system needs to use multiple servers to store data together. But the greater the number of servers use, the more possible the server failures happen. Failures are inevitable especially for a large data storage system. To ensure that the system is still available in the event of a server failure, one piece of data is generally divided into multiple pieces stored on different servers. However, due to the existence of faults and parallel storage, there may be inconsistencies between multiple replicas of the same piece of data.

The distributed storage system requires multiple servers to work simultaneously. As the number of servers increases, some of them break down inevitably. This is bad for the entire system. When some nodes in the system fail, it is required to ensure the read/write requests from a client won't be impacted by the whole system, that is, the availability of the system must be guaranteed.

Another important aspect besides failure resistance in distributed storage system is how to evenly assign data to storage nodes and avoid load balance or data routing of hotspot generated when accessing the system.

SUMMARY

A method/system of distributed data storage using multiple-layers consistent hashing provided in the present disclosure solves the problems of poor fault tolerance and load balance existed in conventional distributed data storage systems.

A distributed data storage system using multiple-layers consistent hashing disclosed may comprise: a plurality of storage nodes providing data storage and redundancy protection; a plurality of management nodes maintaining the properties of the storage nodes and mapping information from virtual groups to storage nodes; a plurality of monitor nodes maintaining the state of storage nodes and handling the changes of states of storage nodes including joining, decommissioning and failure; and one or more clients providing entries for applications or users to access the storage system.

The properties of storage nodes may comprise: node identity (ID), parent node identity (ParentID), layer type (LayerType), weight value of storage node capacity (Weight), virtual identity of a node (VID), identity of a host to which a node subordinates (ServerID), identity of a rack to which a node subordinates (RackID), identity of a cluster to which a node subordinates (ClusterID), IP, Port and state of a node (state).

The storage nodes may form a storage hierarchical tree based on the properties of individual storage node, the storage hierarchical tree has multiple layers each containing nodes of different types, for example, a root layer denotes the entire storage cluster, a device layer (storage node) is at the bottom of the tree (leaf node) and the destination of data storage. Each layer (except the leaf node which has no child nodes) of the storage hierarchical tree is the parent layer of its direct child node, the weight of a parent node equal the sum of weights of all its direct child nodes.

The management node maintains the mapping information of virtual groups to storage nodes based on consistent hashing, the mapping information comprises: the mapping information from virtual groups to qualified storage nodes list; and the mapping information from virtual groups and failed storage node to the replacement node of the failed storage node. The virtual group (VG) herein corresponds to a partition of hash space i.e. hash subspace.

The storage nodes exchange their states through heartbeat messages in two manners which may comprise: considering the request forwarded from the primary node to the secondary nodes as heartbeat when transmitting data; and using messages containing no object data from the primary nodes to the secondary nodes as heartbeat when idle, the secondary nodes sending replies to the primary node to claim their online states.

Because of a fault detection process which detects faults through heartbeat mechanism provided in the distributed data storage method herein, the fault tolerance of the system is improved, ensuring the reliability and availability of the storage process, and avoiding avoids the inconsistencies of data storage due to storage node failures. In order to evenly distribute the data to the storage nodes, an algorithm of multiple-layers consistent hashing is used to avoid load imbalance when accessing the system.

BRIEF DESCRIPTION OF THE DRAWINGS

FIG. 5 is a virtual group-storage nodes mapping table after the process of initial data placement in an exemplary embodiment;

DETAILED DESCRIPTION

The present disclosure will be further described in detail below through specific embodiments in combination with the accompanying drawings. Many details described in the following embodiments are for the purpose of better understanding the present disclosure. However, a person skilled in the art can realize with minimal effort that some of these features can be omitted in different cases or be replaced by other elements, materials and methods. For clarity some operations related to the present disclosure are not shown or illustrated herein so as to prevent the core from being overwhelmed by excessive descriptions. For the person skilled in the art, such operations are not necessary to be explained in detail, and they can fully understand the related operations according to the description in the specification and the general technical knowledge in the field.

In addition, the features, operations or characteristics described in the specification may be combined in any suitable manner to form various embodiments. At the same time, the steps or actions in the described method can also be sequentially changed or adjusted in a manner that can be apparent to those skilled in the art. Therefore, the various sequences in the specification and the drawings are only for the purpose of describing a particular embodiment, and are not intended to be an order of necessity, unless otherwise stated one of the sequences must be followed.

Figure 1:
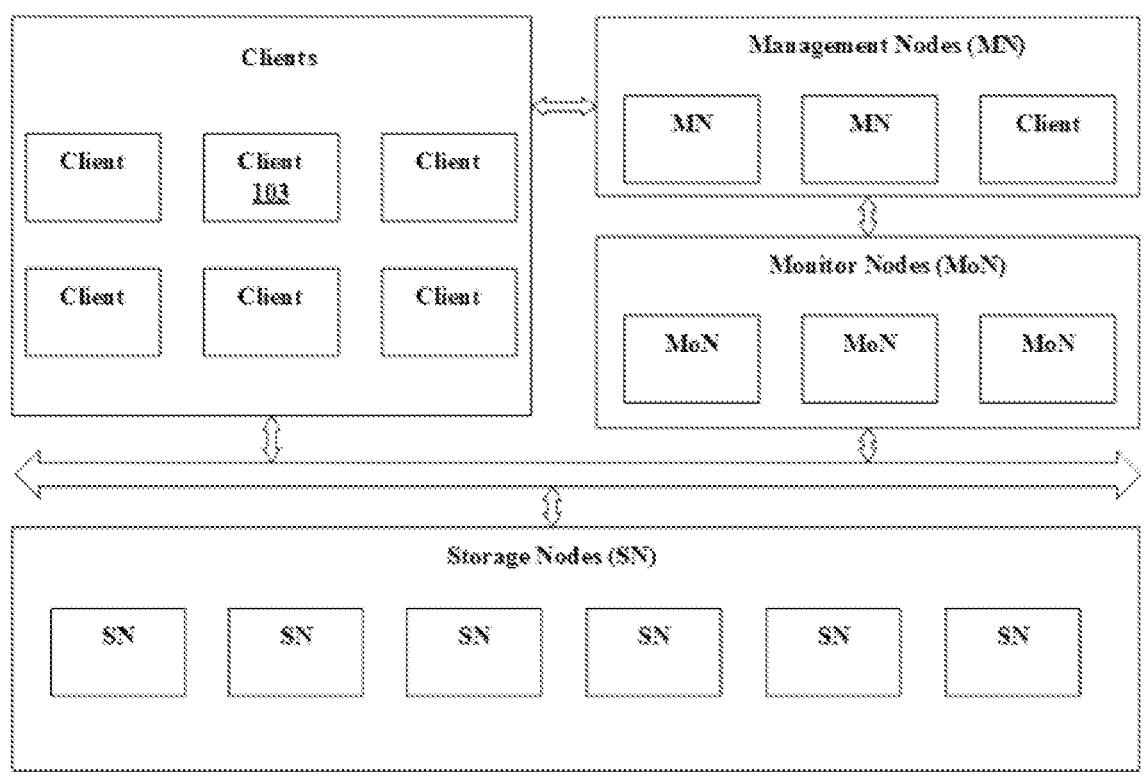
FIG. 1 is a schematic diagram of components contained in an exemplary embodiment of the present disclosure, including storage nodes, management nodes, monitor nodes and clients.

A distributed object storage method and system using multiple-layers consistent hashing include: a plurality of storage nodes providing data storage and redundancy protection; a plurality of management nodes preserving storage node properties and mapping information from virtual groups to storage nodes; a plurality of monitor nodes maintaining the state of storage nodes and handling changes in the storage nodes' joining, decommissioning and failure; and one or more clients providing entries for applications or users to access the storage system. FIG. 1 illustrates the components contained in an exemplary embodiment of the present disclosure, including storage nodes (SN), management nodes (MN), monitor nodes (MoN) and clients.

The first step to store an object is retrieving storage nodes which are responsible for persisting the object. Two-layers mapping to map an object to its destination storage nodes is adopted in the present disclosure. The first layer mapping is to map the object identifier to virtual group (VG), called first mapping. VG refers to a subspace owned by a virtual node. The virtual nodes are evenly distributed in the whole hash space, uniformly partitioning the hash space to a plurality of subspace. We think of VG and virtual node as equivalent. Each (physical) storage node stores multiple VGs, and each VG holds multiple data objects.

First mapping: mapping object(s) to VG (i.e. the hash subspace), which comprises two steps:

(1) Hash computing: let Key denote the identity of an object, the client computes the hash value of the Key:

ObjectHash=Hash(Key)

(2) VG mapping: let VG_NUMBER be the total number of VGs, the client maps the object to VG by modulo VG_NUMBER computation:

VG_ID=ObjectHash % VG_NUMBER

In the present disclosure, VG is the basic unit for data replication or coding storage and storage nodes selection. VG_NUMBER should be large enough, such as 100 times the number of storage nodes. Many of VGs could be in same storage node. Actually, VG_NUMBER is only relative to granularity of load balance in the present disclosure, and has no direct relation with the mapping from VG to storage node(s).

Second mapping: mapping VG to storage nodes which finally store the object. Such mapping is implemented by a mechanism for storage load balance using multiple-layers consistent hashing. When a node joins a cluster, it may be assigned a weight value according to its storage capacity. For example, weight=1.0 denotes that the corresponding node has 1 T storage capacity, weight=2.0 denotes 2 T storage capacity, and the like. Weight denotes a relative storage capability a node has compared with other nodes. The weight of a node in one layer equals to the total sum of weights of all nodes in below layers. The second mapping has two sub-processes: primary node selection, and secondary node selection. A primary node receives requests from client(s) and distributes the requests to secondary nodes. Both the primary node selection and secondary node selection execute in a hierarchical tree structure with nodes on every layer of the tree. Each node has some predefined properties.

In an exemplary embodiment of the present disclosure, the properties of a storage node may include: node identity (ID), parent node identity (ParentID), layer type (LayerType), weight value of storage node capacity (Weight), virtual identity of node (VID), identity of a host to which a node subordinates (ServerID), identity of a rack to which a node subordinates (RackID), the identity of a cluster to which a node subordinates (ClusterID), IP, Port, state of a node (state), etc. The hierarchical relation between nodes can be determined by <ID, ParentID>. A device node, the ultimate storage destination for data object, may be a disk or a partition and located in the bottom-most storage layer; and other storage layer(s) (e.g. Server, Rack, etc.) identify the network architecture where the device node locates, which is used for the mapping from object(s) to device node(s).

Figure 2:
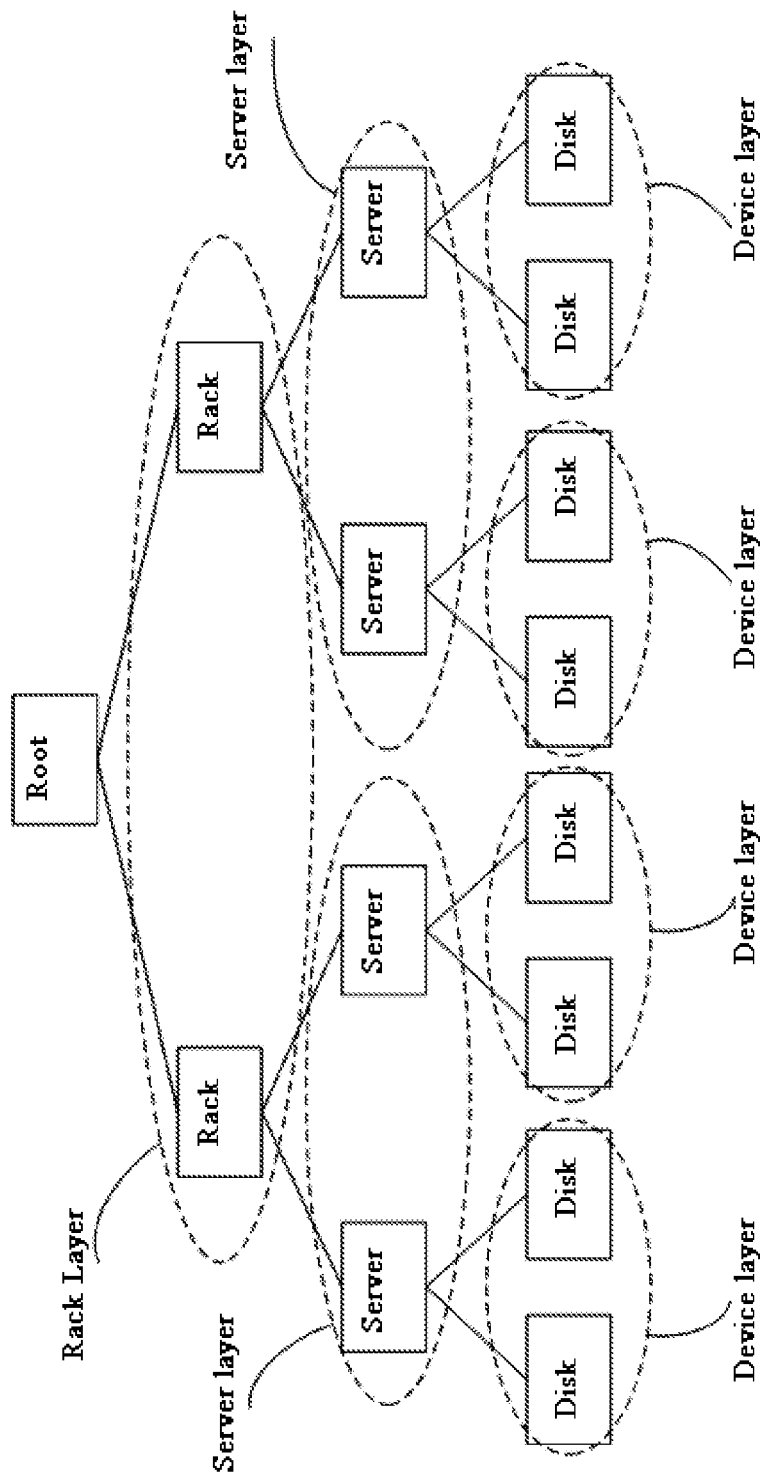
FIG. 2 is a diagram of hierarchical tree architecture of storage nodes using multiple-layers consistent hashing in an exemplary embodiment.

FIG. 2 illustrates an exemplary hierarchical tree architecture of storage nodes using multiple-layers consistent hashing. Besides according to the tree structure of nodes, node selection should also conform storage rules. In an exemplary embodiment of the present disclosure, the storage rules may include: (i) failure domain level containing disk, server or host, rack, cluster and the like; (ii) storage policy covering the maximum number of replicas corresponding to a single object stored in one object storage device, the maximum number of replicas corresponding to a single object stored in one server, the maximum number of replicas corresponding to a single object stored in one rack, the maximum number of replicas corresponding to a single object stored in one cluster and the like; (iii) load balance parameter involving the bias threshold of storage usage (e.g. allowing the actual storage amount deviation between nodes to not exceed 5% or 10%, etc.); (iv) maximum CPU usage; (v) maximum network usage; etc.

Figure 3:
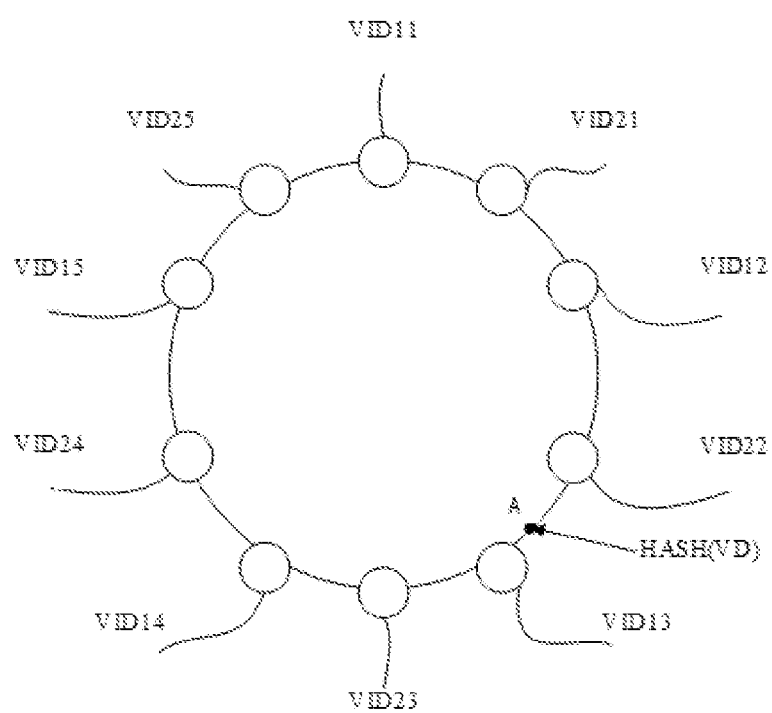
FIG. 3 is a schematic diagram used to explain the process of primary node selection in an exemplary embodiment of the present disclosure.

Primary Node Selection—choose the first node of qualified storage nodes list of a VG as the primary node. The primary node may receive requests from clients, encode/decode/replicate objects in the requests, distribute redundant objects to secondary nodes (writing operation) or collect blocks of objects from secondary nodes (reading operation), and send acknowledgments for requests to client(s). FIG. 3 illustrates an exemplary VIDs assignment in a node layer, which is used to explain the process of primary node selection. Suppose the architecture of the cluster be the illustration in FIG. 3. The whole cluster is denoted by a root node in the top layer. The root node has two racks each of which has two hosts/servers. Each host has two disks. In the present disclosure, disk(s) is called device(s) or storage node(s) which is a special kind of node (having no child node) and target device(s) storing data. The device node(s) always locates in the bottom layer of the whole cluster. Primary node selection chooses node(s) or device(s) in a manner of depth first search (DFS) from root down to leaf nodes in the hierarchy of the cluster using storage rules as pruning policy. In FIG. 2, the first layer under the root is a rack layer, the layer direct below the rack layer is a server layer, and then a device layer at the bottom. According to the exemplary embodiment illustrated in FIG. 3, the process of primary node selection is as follows. The primary node selection may be performed by a system administrator before the storage cluster can be used to store data (i.e. at the initialization of the cluster).

(1) Multiple VIDs are allocated randomly to each rack (such as setting VID_NUM=5 based on weight), then as shown in FIG. 3, Rack1:{VID11,VID12,VID13,VID14,VID15}

Rack2:{VID21,VID22,VID23,VID24,VID25}.

(2) The VIDs of rack 0 and rack 1 are mapped into hash space, that is, the hash value of each VID is computed and each VID is put in a hash ring according to its hash value.

(3) The hash value of ID of the VG is computed in the same hash space, and HASH (VG_ID) is supposed to be mapped in point "A" in FIG. 3.

(4) Searching is performed from "A" in a clockwise direction to find that the first VID is VID 13 which belongs to Rack 1, so Rack 1 in the rack layer is chosen.

(5) The same procedure is continued from the rack layer to the device layer, and the primary node for this VG is chosen, which is normally a disk or partition.

In the exemplary of primary node selection, each node may be assigned multiple VIDs. In the embodiment of the present disclosure, the number (VID_NUM) of VIDs assigned to each node in each layer is determined according to the weight of corresponding node which is the sum of weights of all child nodes in direct lower layer. For example, let weight unit (weight=1.0) denote 1 T storage space, we can allocate 5 VIDs for 1 T storage. If a node has 5 T storage, it may be allocated 25 VIDs. The direct child nodes of a parent node may share the same hash ring/space. Such that, all of the storage devices or nodes in a server, i.e. the lower layer (device layer) of the server layer, may share the same hash ring/space. Note that, storage node, device and disk or its partitions are interchangeable in the present disclosure. If a server has six disks or partitions and each disk has five VIDs, the hash space of this server may be divided into 30 subspaces, one of which will be eventually chosen by a VG, that is, a disk or partition may be a storage destination of this VG.

Figure 4:
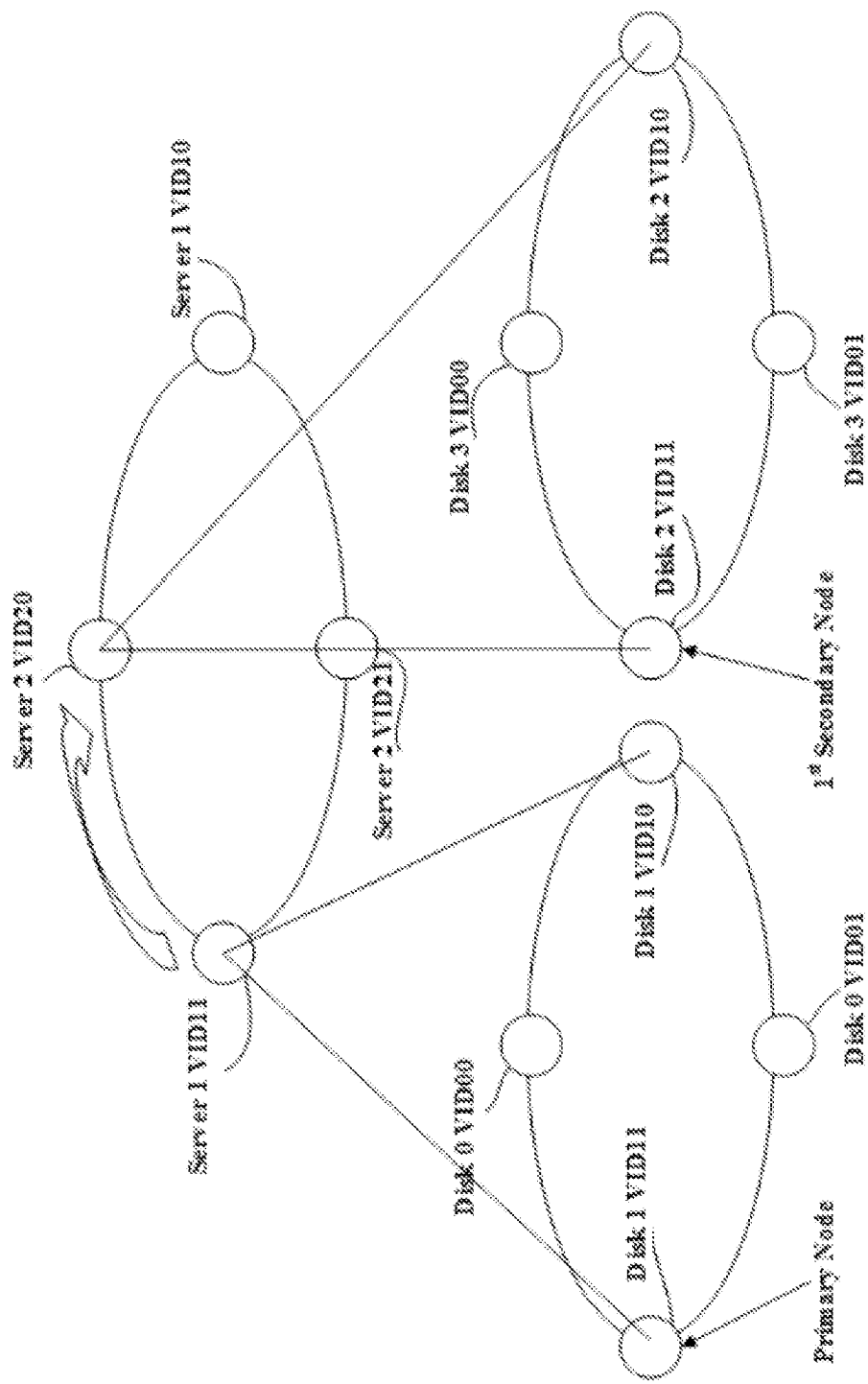
FIG. 4 is a schematic diagram used to explain the process of secondary node selection in an exemplary embodiment of the present disclosure.

FIG. 4 illustrates the process of secondary node selection. For high availability and high reliability of data, an object is stored in more than one secondary nodes except the primary node. The primary node stores an original object (for the policy of multiple repetitions) and a first block generated by coding algorithm (for the policy of erasure coding, network coding, etc.). The secondary nodes store the replicas of the original object (for the policy of multiple repetitions), or store other data/parity check/coded blocks of coded storage object (for the policy of erasure coding, network coding, etc.). There are two policies for secondary node selection used in an exemplary embodiment of the present disclosure.

(1) Selection from primary node to last secondary node one by one: Each of all devices is selected only once, that is, each storage node occurs once in the qualified storage node list. This policy is suitable for cluster which has sufficient nodes, e.g., more than the number of object repetitions.

(2) Selection with rounding back to primary node: If the cluster has fewer nodes, each node may be selected more than once. That is, each primary node or secondary node can preserve a plurality of replicas or partitions of one object of VG.

We only explain the policy (1) herein. The policy (2) is trivial for a person skilled in the art. Similar to selection of primary node, according to storage rules, secondary node(s) may be chosen in a manner of depth first search (DFS) from root node down to leaf nodes in the hierarchy of cluster(s) using storage rules as pruning policy. Storage rules set constraint(s) when choosing secondary node(s). A node may or not be a candidate secondary node is determined by whether or not the candidate collides with other chosen nodes (e.g. it has already been selected) and satisfies the constraint defined in storage rules.

Suppose we want choose one secondary node in an identical rack but not in an identical server, that is, choosing another subspace belonging to a different server in the server layer. FIG. 4 is a high-level view of an exemplary embodiment of choosing secondary storage node(s) based on the position of the primary node which is selected in preceding process of primary node selection. We use VID to denote the subspace in the hash ring of each layer. Suppose Disk 1 in Server 1 be chosen as primary server of VG in the process of choosing primary server. VG locates in hash subspace belonging to VID 11 of Server 1. According to storage rules (assuming one server can store only one object or replica of VG), we need to choose in Server Layer another VID which follows VID 11 but not belongs to Server 1, i.e. VID 20 belonging to Server 2. Next, subspace is selected in the Device Layer which belongs to Server 2. VID should select the first hash subspace node encountered in a clockwise direction starting from HASH (VG_ID). Suppose one VID of Disk 2 be chosen, that is, the hash value of VID of the disk immediately follows HASH (VG_ID). As shown in FIG. 4, Disk 2 in Server 2 is chosen as a first secondary node; then a second secondary node is chosen from another server of the same rack (or a server of another rack selected from its parent rack layer) in same way according to storage rules which is also the pruning policy to accelerate the selection execution; other secondary node(s) is selected in the same way in turn.

FIG. 5 illustrates a VG-StorageNodes mapping table after the process of initial data placement in an exemplary embodiment of the present disclosure. The table is arranged based on the hierarchical topology of cluster nodes. For each VG, its storage position can be computed with inputs; wherein cluster architecture, weight of every node in the cluster, assigned VIDs list of every node and current storage rules are taken as the inputs. The process consists of two sub-processes: primary node selection and secondary nodes selection, both of which have been described above and will not be repeated here. For a preferred embodiment of the present disclosure, the VG-StorageNodes map can be implemented in a table of a distributed memory database for high performance. The VG-StorageNodes mapping table is maintained by management nodes which adjust the mapping between VG and storage nodes to make the map reflect the membership changes of storage nodes in case of joining, decommissioning or failing, thereby rebalancing the object(s) to its proper destination(s). In FIG. 5, each record or entry of the VG-StorageNodes table contains a VG_ID and its qualified nodes list including primary node and secondary nodes. For each object, the client(s) first obtains VG by computing the first mapping, queries the VG-StorageNodes table using VG_ID as primary key, and then the client(s) sent the object to the nodes listed in the storage nodes list or retrieve the object from the nodes listed in the storage nodes list. The VG-StorageNodes mapping takes an initial data placement mapping before the cluster starts to run or before no storage nodes failure ever occur as an initial state.

In a distributed storage system especially a large scale one, failure is normal. Besides failure, maintenance is also necessary in case of storage nodes adding/joining and removing (permanent fault)/decommissioning (aging). So, an initial data placement map should change as the state of storage node(s) changes. To make the initial data placement map update with the state change of storage nodes, the first thing is to detect a failure (i.e. performing Failure Detection), because the failure is a passive event while adding/joining and removing/decommissioning are proactive and can be handled by an administrator actively.

Failure Detection—Suppose the state of the monitor node(s) is maintained by PAXOS, at any time, there exists one primary monitor node which is online and maintains the state of all storage nodes. If one monitor node is offline due to failure, another monitor node can be restarted by the administrator or automatically. In an exemplary embodiment of the present disclosure, the state of all the storage nodes is stored in the distributed memory database for high performance using node ID as primary key. The monitor node(s) and client(s) can retrieve the state of the nodes in the qualified storage nodes list of VG(s). The state maintenance of qualified storage nodes list of each VG is coordinated by the monitor node with the help of primary node and secondary nodes. The failure detection can be implemented by means of heartbeat mechanism. When in idle state i.e. no requests from client(s), the primary node sends heartbeat message to each secondary nodes to claim its primary position. When handling requests from client(s), the primary node sends replica(s) of object(s) or its partition(s) to the secondary nodes which can also be considered as heartbeat. In this situation, the real heartbeat is delayed. The primary node of each VG sends heartbeat to all secondary nodes of VG, and each secondary node sends acknowledge to the primary node to claim its liveness. If any secondary node fails to reply the acknowledgment of the heartbeat within a preset interval, the primary node may report the failure of the secondary node to the monitor node. If any secondary node fails to receive heartbeat within a current interval, the secondary node may report the failure of the primary node to the monitor node. We use VG-Version to denote the state change of the primary storage node in VG qualified nodes list. A temporary primary node would be chosen after one primary node failed, and the VG_Version increases by one. The real heartbeat message contains only VG_Version without any other data. When the primary node in VG qualified nodes list for any VG fails, the monitor node chooses a temporary primary node (TPN) according to a temporary primary node selection principle, thereby choosing a primary replacement node for the failed primary node. When any secondary node fails, the monitor node may choose a secondary replacement node for the failed secondary node. The failed primary or secondary node replaced by replacement node may be called host node.

Temporary Primary Node Selection Principle—The primary storage node holds the longest committed transaction list (CTL) and submitted transaction list (STL) before failure, and the (new) temporary primary storage node should also have max possibility to keep CTL and STL invariant (that is the selected temporary primary storage node has the longest CTL and STL among all the candidate secondary nodes). Selection principle: a first secondary storage node which has no replacement node and possesses largest submitted transaction ID, largest committed transaction ID and latest VG version is always chosen as the temporary primary node (TPN). If an old primary node returns to the cluster within a time of TEMP_FAILURE_INTERVAL, it may be assigned as primary node again. This is the primary invariant, that is a primary node always be primary if possible.

Figure 6:
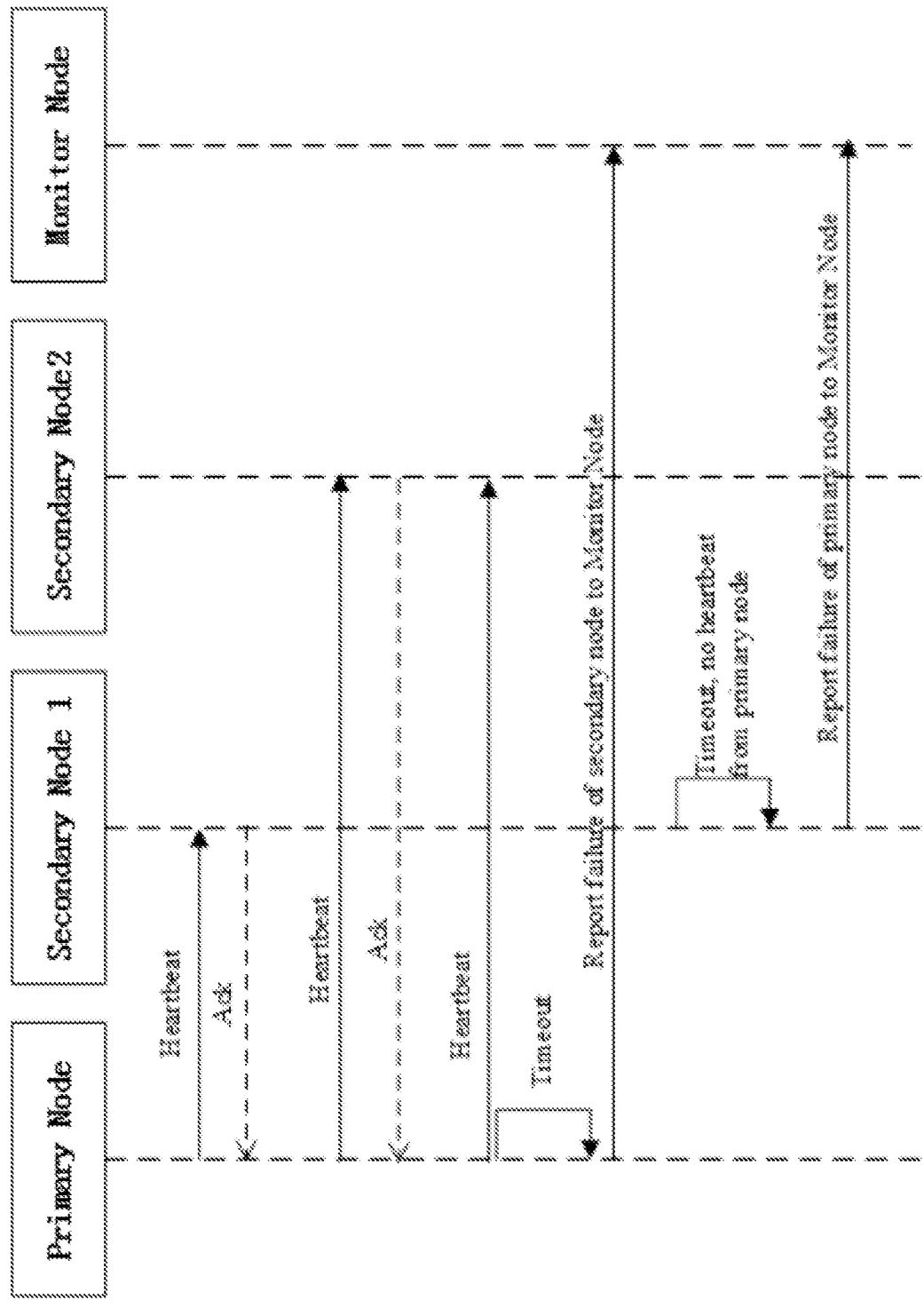
FIG. 6 is a flowchart of a failure detection algorithm in an exemplary embodiment of the present disclosure.

Temporary Primary Node Selection—The monitor node selects a new primary node from current surviving secondary storage nodes using the temporary primary node selection principle. If any secondary storage node fails to receive request message from the primary node within a preset interval, the secondary storage node may report the failure of primary node to the monitor node, which may start the process of temporary primary node selection. If any secondary node fails to receive any heartbeat or request message from the primary node, the primary-secondary relationship (PSR) may be considered as being expired by this secondary node. The PSR is established once a node in the qualified nodes list is chosen as the primary node or temporary primary node for any VG. PSR is identified by VG_Version which is increased by one once a new primary node is selected or an old primary node gets back (for example an original failed primary node rejoins the cluster after a failure). The secondary node which has expired PSR may report such change to the monitor node. The report message about failure may consist of latest committed transaction ID (LCMI), latest submitted transaction ID (LSTI) and current VG version (CVV). Upon receiving the report message from the secondary node(s) acted as candidate primary node(s), the monitor may first check CVV to exclude the candidates having lower VG version, then check LCMI from current candidate(s) to exclude the node(s) having lower LCMI, and at last check LSTI to exclude nodes having lower LSTI. In any of these checks, if only one candidate left, the check ends and the candidate is chosen as the temporary primary node. If none of nodes is chosen in this process, the VG may be set unavailable; requests from any object mapping to this VG will definitely fail, because no node can accept these requests. If the temporary primary node is selected successfully, it may handle subsequent requests from client(s) in the place of the failed primary node. When the failed primary node rejoins the cluster within a temporary failure interval (TEMP_FAILURE_INTERVAL), after updating consistent hash and recovering data, the new joining primary node is set as primary node again. FIG. 6 illustrates the flowchart of failure detection algorithm in an exemplary embodiment of the present disclosure.

Replacement Node Selection using Locality Affinity Principle—As described above, any node (either primary node or secondary node) fails, a monitor may choose a replacement node to handle request(s) which should be allocated to the failed node. The selection of the replacement node may be performed according to the locality affinity principle. That is, the new chosen candidate is selected first in the same layer such as in a same server, then same rack, and so on. The locality affinity principle implies that the failed node and the replacement node may be in the same failure domain. If a candidate in the identical failure domain has already been in the qualified nodes list, i.e. it is collision in with another storage node in the same layer, then the selection may be continued in upper layer in DFS manner, until the replacement node that is satisfied the storage rules is chosen. Similar to the selection of secondary node(s), the DFS retrieval process uses the storage rules as pruning policy. If the failed node rejoins the cluster and recovers data quickly, the selection with the locality affinity principle may ensure fast data moving from the replacement node to the rejoined node.

Figures 7, 8:
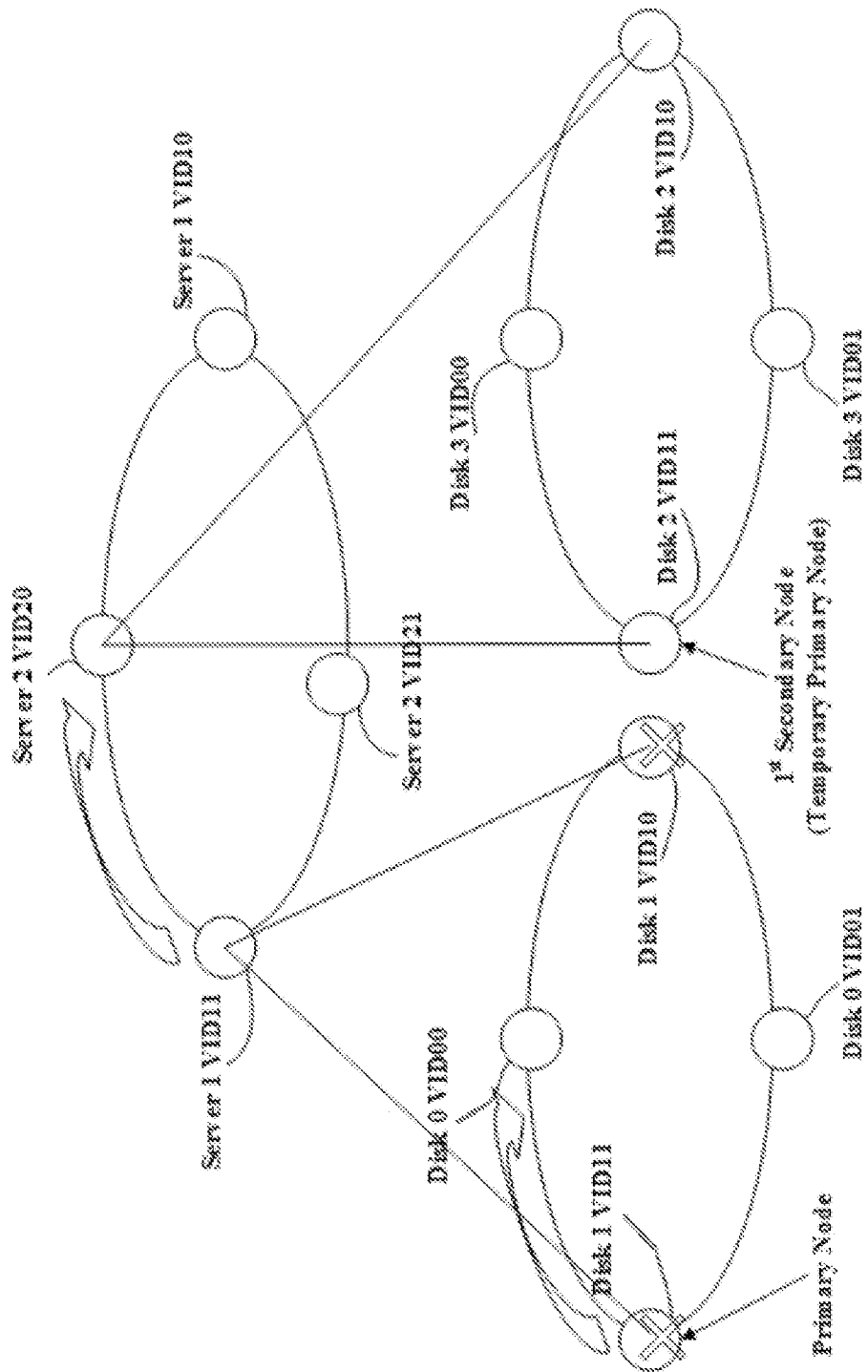
FIG. 7 is a virtual group-replacement nodes mapping table when a storage node malfunctions in an exemplary embodiment of the present disclosure.
FIG. 8 is a schematic diagram of a temporary failure recovery algorithm in an exemplary embodiment of the present disclosure.

FIG. 7 illustrates a VG-ReplacementNode(s) mapping table when a storage node fails in an exemplary embodiment of the present disclosure. In a preferred embodiment, the VG-ReplacementNode(s) mapping can be implemented in a table in a distributed memory database (DMDB). The VG-ReplacementNode(s) table is stored as metadata in the cluster of the management node. Any monitor node can query the table. If any monitor node fails, it can be restarted in current or another server, and the VG-Replacement Node(s) table is stable (consistent) due to the consistency of database. The VG-ReplacementNode(s) table consists of entries with a format <VG_ID, Host Node ID, Replacement Node ID List>, using <VG_ID, Host Node ID> as primary key. The host node (Host Node ID) is a failed primary or secondary node. For each VG, each host node may have a plurality of replacement nodes, because the replacement nodes may also fail; and another replacement node should be chosen for this failed host node. But there is only one online replacement node at any time. The state of the replacement node(s) and all the storage nodes are maintained by the management node(s).

When failure happens, the requests supposed to the failed node may be redirected to its corresponding replacement node. We discriminate two kinds of failure herein: temporary failure and permanent failure. If the failed node does not rejoin the cluster within a preset temporary failure interval (TEMPORARY_FAILURE_INTERVAL), the node may be marked as in a temporary failure state (TEMPORARY_FAILURE). If the failed node rejoins within TEMPORARY_FAILURE_INTERVAL and reports the rejoining to the monitor, the node is subsequently marked as in a temporary failure recovering state (TEMPORARY_FAILURE_RECOVERING) and the monitor may start the process of temporary failure recovery. If the monitor fails to receive the rejoining message from this mode after a preset permanent failure interval (PERMANENT_FAILURE_INTERVAL), the node may be marked as in a permanent failure state (PERMANENT_FAILURE). The monitor starts permanent failure recovery for this failed node and VG(s) stored in the failed node. Both the temporary failure recovery and permanent failure recovery consist of two phases: distributed hash table (DHT) recovery and data recovery. DHT recovery keeps the mapping from VG to qualified storage nodes list consistent with the state change of the storage nodes in the cluster. Data recovery moves data to its destination according to the mapping from VG to qualified storage nodes. The mapping from VG to qualified storage node(s) is maintained by the management nodes, and the updating of different position of entries for different VGs can be performed concurrently by different management nodes. That is the meaning of "distributed" in a distributed hash table (DHT).

Temporary Failure Recover of Distributed Hash Table (DHT)—When a storage node receives the state change of cluster which represents the state of some nodes are marked as TEMPORARY_FAILURE, all stored virtual groups (VGs) are traversed, and the VG is marked as in the state of TEMPORARY_RECOVERING when a node in the VG qualified nodes list is in the state of TEMPORARY_FAILURE. If the failed node is the primary node, its responsibility may temporally be taken over by the temporary primary node (TPN) which is selected using TPN selection algorithm explained above. The VID(s) of the failed node, which is more than one in number, may be temporally masked, the TPN may, based on the locality affinity principle, firstly choose a replacement node in the same failure domain of the failed node, such as identical server, identical rack, etc. The update operation during recovering may redirect to the replacement node. If the failed node recovers within the time of TEMPORARY_FAILURE_INTERVAL, the update (of data) may be moved to the new recovering node from the temporary node. That is what the temporary failure recovery of DHT does.

For each VG with VG_ID, suppose a node belonging to the VG qualified nodes list fails and the node is the primary node. FIG. 8 illustrates a schematic diagram of the temporary failure recovery algorithm in an exemplary embodiment of the present disclosure. Suppose the first secondary node become TPN as the Disk 2 VID 11 of Server 2 shown in FIG. 8. Suppose failed VG locate in the hash space of Disk 1 VID 11 of Server 1, the monitor node chooses another VID which is in the same device layer but not belongs to Disk 1, that is, the VID follows HASH (VID11) in a clockwise direction, and as shown in FIG. 8, the VID which is nearest to VID11 and not belongs to the failed Disk 1 in the hash space of device layer is chosen, so VID 00 in Disk 0 is chosen. All the updates may be redirected to the replacement node in Disk 0. The failed primary node in Disk 1 may be selected again as the primary node after it comes back, and all its VIDs may be returned to hash ring. For the temporary failure recovery of DHT, the monitor node may update the information table of storage nodes (including their state), the VG-StorageNodes mapping table and the VG-ReplacementNodes mapping table.

The monitor node first modifies the table of storage nodes, the state of the failed node is marked as OFFLINE; and for the update of the VG-QualifiedStorageNodes mapping table, it marks the state of corresponding failed node in the table as OFFLINE. Before it rejoins the cluster and its state is changed to ONLINE, the failed node may not be chosen as the primary node or replacement node any more, and all the VIDs assigned to it are masked in the hash space. For the update of the VG-ReplacementNodes mapping table, the monitor node adds an entry <VG_ID, the failed node ID, the replacement node ID> to the VG-ReplacementNodes mapping table. There may be many VGs stored in the failed node. The monitor traverses the VG-StorageNodes mapping table to find the VG(s) having the failed node(s) in their qualified storage nodes list. For all the VGs, a corresponding entry <VG_ID, failed node, replacement node ID> may be inserted to the VG-ReplacementNodes mapping table.

Permanent Failure Recovery of DHT—When a storage node receives the state change of cluster which represents the state of some nodes are marked as PERMANENT_FAILURE, it may traverse all VGs, and when a node in its qualified nodes list is in a state of PERMANENT_FAILURE, it may mark the state of a VG as PERMANENT_FAILURE_RECOVERING. For the monitor node:

(1) Masking all the VIDs belonging to the failed node(s).

(2) Reweighting the nodes in a layer upper than the layer in which the failed node locates (from the layer where its direct parent node locates to the layer where the root node locates). The nodes in upper layer(s) may mask one or more its VIDs if necessary.

For example, if one VID in a server denotes two disks, when two disks corresponding to one VID in the server fail, the server may mask this VID. If the masked VID is in a different server from the one where a next VID in hash space locates, data migration from this server to another server may happen. If the masking of VID does not happen in upper layer, the data migration may occur among all the nodes in same layer according to the rule of consistent hashing, and the migration speed may be faster than moving to other layer. That is the advantage of local affinity principle.

Figure 9:
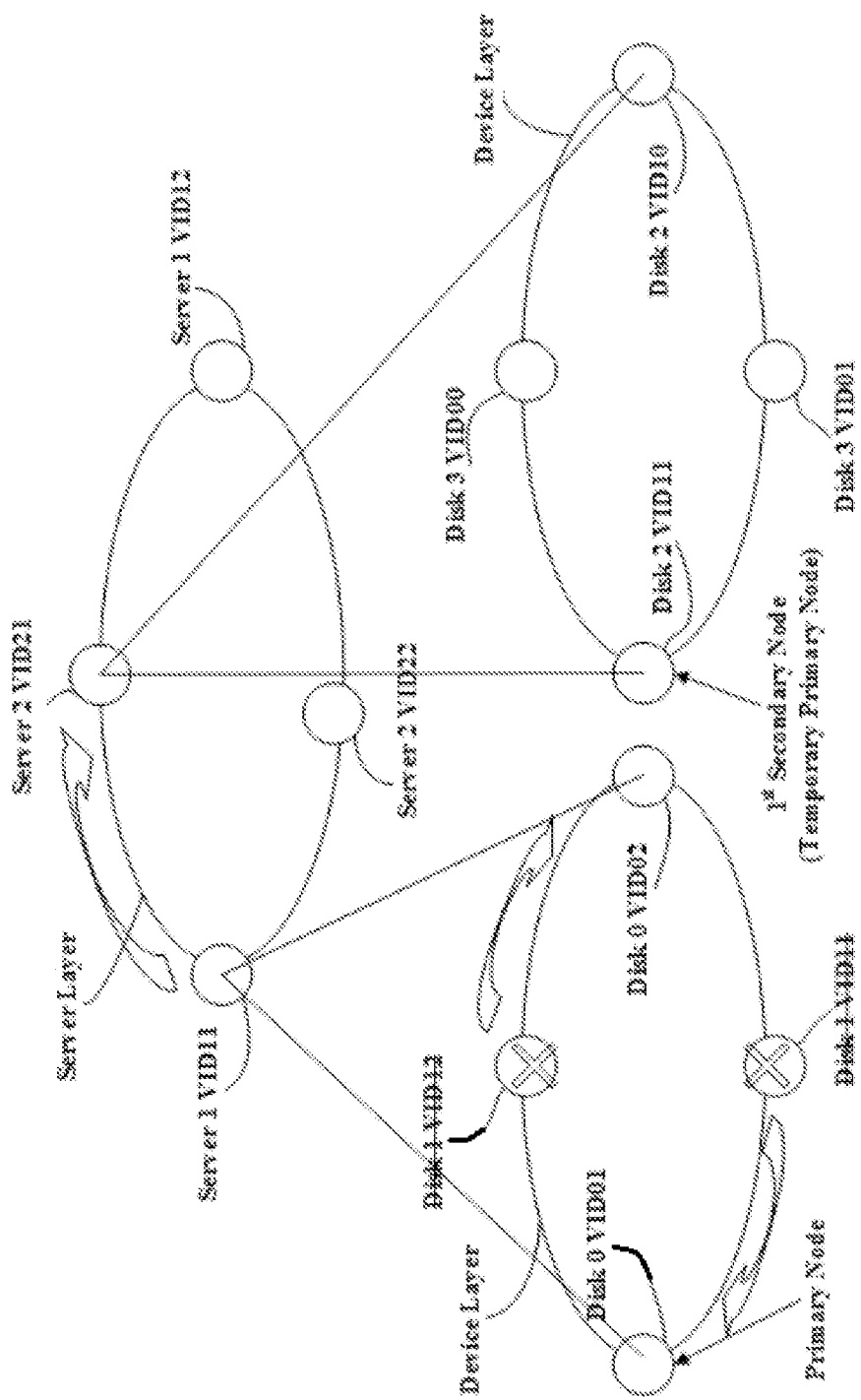
FIG. 9 is a schematic diagram of a permanent failure recovery algorithm in an exemplary embodiment of the present disclosure.

FIG. 9 illustrates a schematic diagram of permanent failure recovery of DHT in an exemplary embodiment of the present disclosure.

Suppose the VID in Server 1 remain unchanged after reweighting, the data migration only happens between Disk 1 and Disk 0 in the same device layer (below the layer in which Server 1 locates). Suppose Disk 1 fails, its VIDs={DVID11, DVID12 . . . } may be masked. The VGs in Disk 1 need to be recovered in Disk 0 with VIDs={DVID01, DVID01 . . . }. The entries of VG-QualifiedNodes in the VG-StorageNodes table may be modified firstly before data recovering. If after reweighting, the VID 11 in Server 1 should be masked, the data in Server 1 will be migrated to another server (Server 2 in FIG. 9). In an exemplary embodiment of the present disclosure, the permanent failure recover of DHT algorithm performed by the monitor may include the followings.

(1) The VG-StorageNodes table is traversed to find out all the VGs stored in all failed nodes and their qualified nodes list containing the failed nodes.

(2) For each VG, the VG-ReplacementNodes table is traversed to find out the unique only replacement node for this failed node.

(3) For each VG, the failed node is replaced with the online replacement node in VG qualified nodes list.

(4) The entry <VG_ID, failed node ID, replacement node ID> is deleted from the VG-ReplacementNodes table after finishing data recovery described below.

Temporary and Permanent Failure Recovery for Data—The process of data recovery is coordinated by a primary node (PN) or a temporary primary node of a VG or an independent repair node (TPN), these nodes can be the monitor node or the new joined node. VG is the basic repair unit.

Suppose the repair process is handled by the primary node. There exist some permanent variables used for data storage and recovering in each node in the VG storage nodes list. For the permanent variables in each VG storage node, the initial value of a VG version is 0 when the VG is created for the first time, and it may increase monotonically by 1 when the VG qualified nodes list changes. After a node rejoining the cluster, it connects to the storage management node, checks whether there has any replacement node. If no replacement node exists, no data needs to repair for this rejoined node. If there are replacement nodes and one of them is online, the submitted and committed transaction lists are copied from the corresponding replacement node to the rejoined node. Note that, the submitted transaction list (STL) and the committed transaction list (CTL) can be tiering, that is, storing STL in medium with higher performance (such as SSD), and storing CTL in a medium with high capacity but lower performance. In the replacement node, both the STL and CTL are not applied to (placed in) a permanent storage medium (e.g. HDD), but applied to their final storage destination i.e. the rejoined node. But if the host node of the replacement node is in permanent failure, the replacement node may be in the role of the failed host node, which means STL and CTL will be applied to the replacement node. If all the replacement nodes are offline, the repair may be delayed for the time of TEMPORARY_FAILURE_INTERVAL at most. If the replacement node recovers within TEMPORARY_FAILURE_INTERVAL, the rejoined node may copy STL and CTL from the replacement node to a local storage medium. If no replacement node goes back to the cluster within such time, the rejoined node needs to repair the data redirected to the replacement node. The rejoined node sends a last committed transaction ID to the primary node (PN) or temporary primary node (TPN), PN or TPN replies with a first committed transaction ID (FCTI), a last committed transaction ID (LCTI), a first submitted transaction ID (FSTI) and a last submitted transaction ID (LSTI). The object data relative to the transaction with ID in the range of (Rejoining LCTI, Primary LCTI] needs to be repaired/regenerated by replication, erasure coding or network coding. The object data relative to the transaction with ID in the range of [Primary FSTI, Primary LSTI] (i.e. no online replacement node) or the range of [Rejoining FSTI, Replacement FCTI] (i.e. online replacement node exists) needs to be repaired/regenerated to replace the replacement node STL.

If the rejoined node is an old primary node, after obtaining the ranges of transaction ID (Rejoining LCTI, Primary LCTI] and [Rejoining FSTI, Replacement FCTI], the management node may reassign the rejoined node as the primary node according to the invariance principle of primary node, and the new primary node may continue to handle the requests from clients. If a storage node fails to rejoin the cluster within the time of TEMPORARY_FAILURE_INTERVAL, it may be considered as a permanent failed node (PFN). The replacement node of the permanent failed node may be promoted into the qualified nodes list, the data missed in the PEN needs to be repaired in this new qualified node. The primary node or temporary primary node traverses all storage objects in the VG directory and sends a name list of the objects and an ID list of nodes used to help repair (referred to as helper nodes) to the new qualified node. When adopting the policy of multiple repetitions, the helper node is the primary node or the temporary primary node; when adopting (N,K) erasure coding, the helper node is the first K online nodes in the VG qualified nodes list. The new qualified repair the failed objects one by one. The element in the object name list may, but not limit to, consist of <object id, object version, last operation code, last transaction id>. Note that, the object with lower version cannot overwrite the object which has the same object ID but larger or equal version. The helper node is determined by the management node. The principles of choosing online helper nodes are: in the VG qualified node list, firstly choosing the nodes which do not have replacement nodes, then choosing the nodes having larger committed transaction ID, and finally choosing the nodes with larger submitted transaction ID.

Adding Node(s) Process—The hierarchical structure of the cluster(s) may be changed when adding node(s). Performing reweighting on nodes in layers from the one upper than the layer where the adding node locates till the one where the root node locates. The nodes on reweighting path may be allocated with new VID(s) if enough space is added. The data may be migrated to this device domain from other device domain in the same layer. For example, for two racks in an identical layer, if one rack A is added with many disks, the data in other rack B may be migrated to the rack A for storage load balance.

Figure 10:
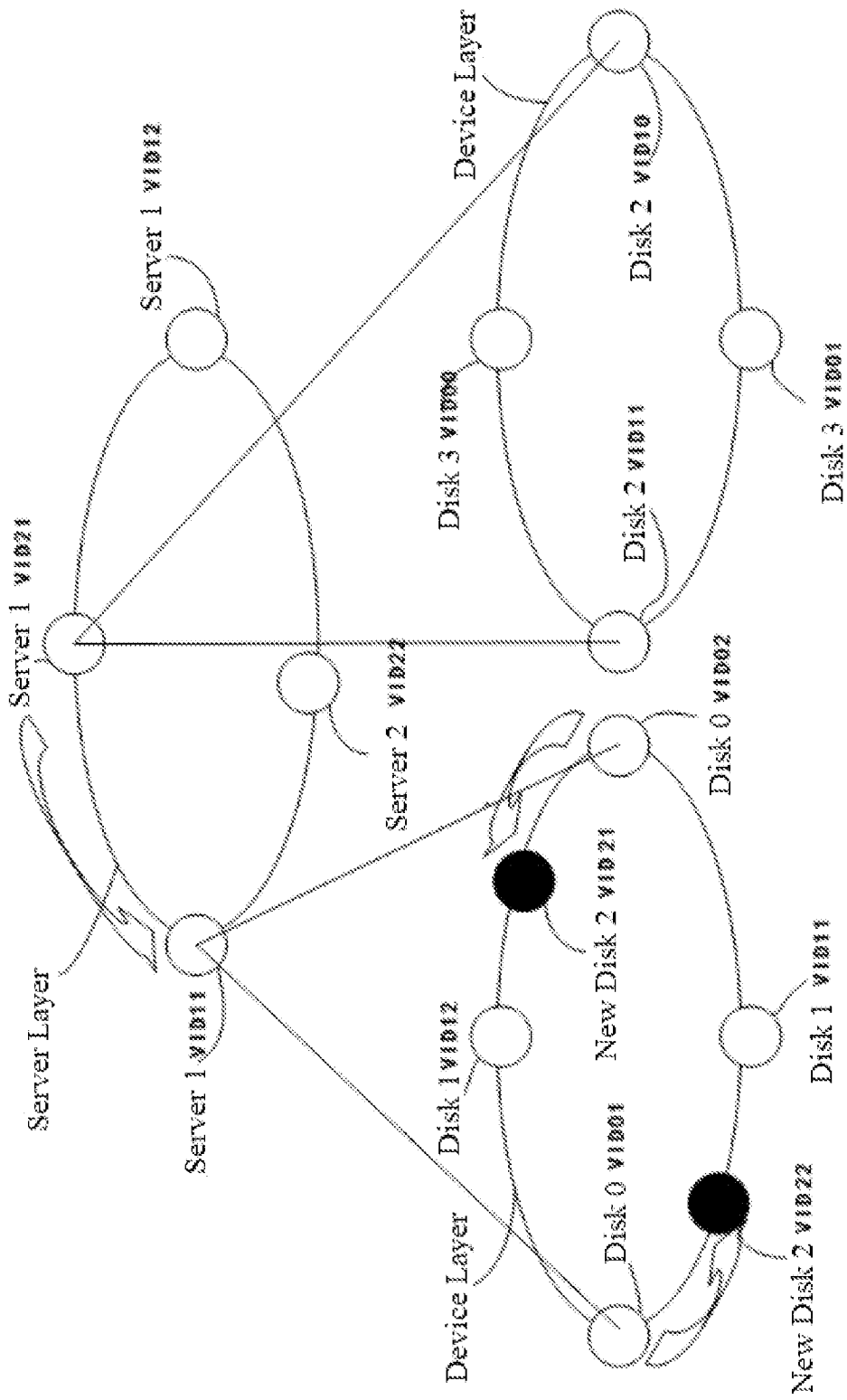
FIG. 10 is a schematic diagram of an adding node algorithm in an exemplary embodiment of the present disclosure.

FIG. 10 illustrates the flowchart of adding node(s) in an exemplary embodiment of the present disclosure. Suppose a new disk 2 is added to server 1 at the device layer.

The monitor node randomly allocates VID to disk 2 according to its weight, such as new disk 2 VID 21, new disk 2 VID 22, etc. The weight of server 1 should be increased so as to equal the sum of weights of all its child nodes, i.e. disk 0, disk 1, disk 2 shown in the figure. When enough disks are added to be equivalent to the weight threshold corresponding to one VID in an upper layer, Server 1 may need additional VID randomly generated. Suppose server 1 is not added with new VID, the data migration may be between the old disk(s) and the new coming disk. Since the new disk 2 has new VID corresponding to the subspace of hash ring in the layer below the one in which server 1 locates, the data may be migrated from disk 0 and/or disk 1 to the new disk 2 for storage load balance. If server 1 is added with sufficient disks, it may be assigned additional VID(s), leading to change the hashing partition in the server layer, further resulting in data migration within the server layer.

In an exemplary embodiment of the present disclosure, the process of adding node(s) performed by the monitor node may include as follows.

(1) For each VID (referred to as predecessor VID) assigned to a new added node, a subsequent VID (shortly referred to as successor VID) belonging to another node (i.e. successor node) of the same layer is searched in a clockwise direction. Obviously, the predecessor VID is the preceding node of the successor VID in hash space of the layer where both the new added node and its successor node locate.

(2) All VGs in the VG-StorageNodes list is traversed to find out the VGs which are stored in the VID subspace of the successor node (i.e. VG qualified nodes list) and have hash values (HASH (VG_ID)) which are more closed to the VG of predecessor VID, that is those VGs may be moved to the new added node (i.e. predecessor node).

(3) For each VG which should be moved to the predecessor node, the qualified nodes list of corresponding VG are updated in the VG-StorageNodes table, that is, replacing the successor node in qualified nodes list with the predecessor node after the data in VG is moved to the predecessor node.

Removing/Decommissioning Node(s) Processing—The process is similar to that of permanent failure recovery except that: the process of failure is positive and unpredictable; while the process here is active and can be handled by an administrator of the cluster. No data recovery is needed in this process, and data migration is only performed in local layer or upper layer. When many disks are removed and sufficient VIDs are masked, the devices in the layer upper than the layer in which the removed disk located may need VIDs adjustment. Data migration may only happen between the node(s) to be removed/decommissioned and other storage nodes due to the property of consistent hashing. There is no migration among the storage nodes which are not removed.

Figure 11:
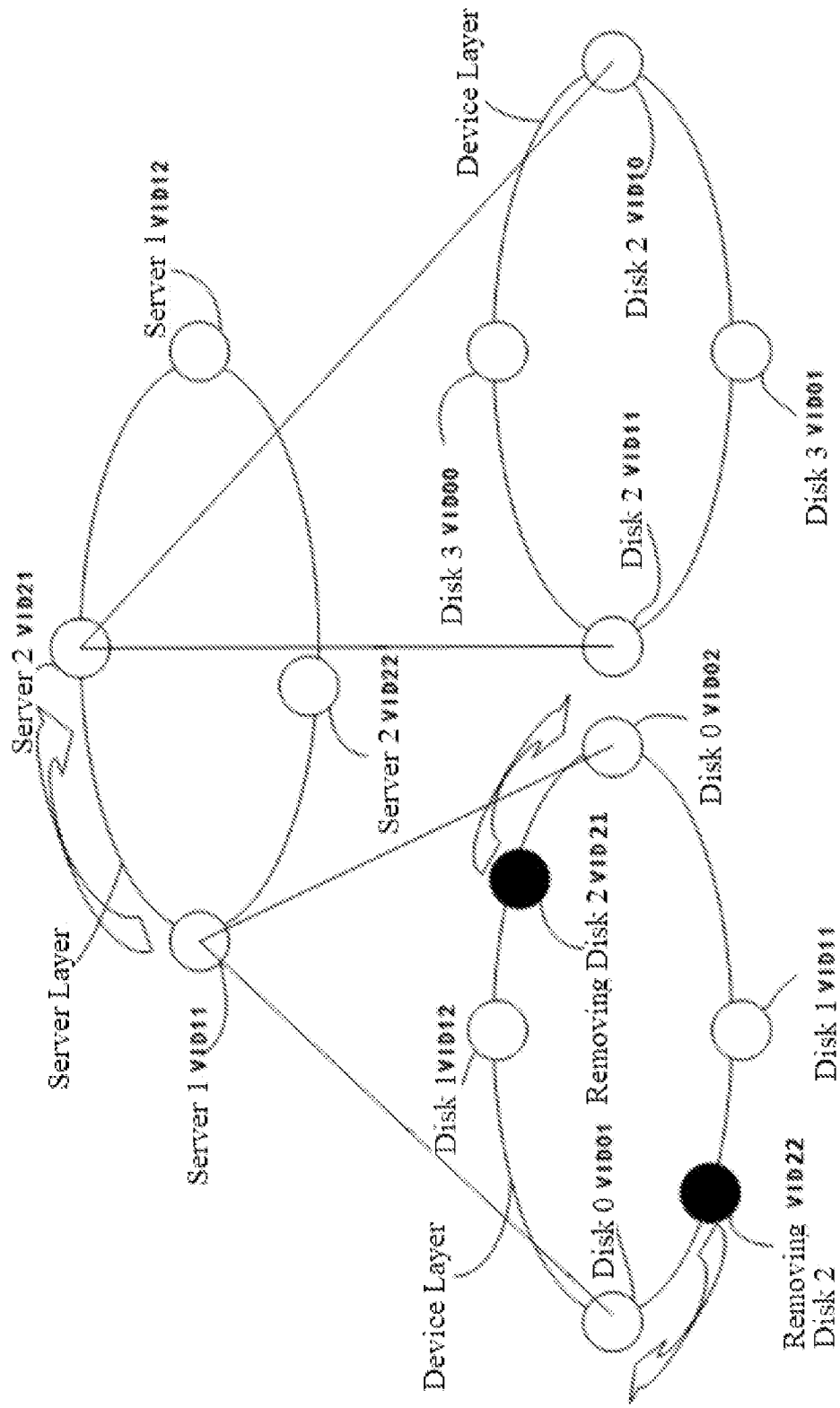
FIG. 11 is a schematic diagram of a deleting node algorithm in an exemplary embodiment of the present disclosure.

If sufficient disks are removed, the data may migrate to the devices in upper layer. FIG. 11 illustrates a schematic diagram of removing/decommissioning node(s) in an exemplary embodiment of the present disclosure. Suppose disk 2 at the device layer is going to be removed from server 1 at the server layer. The monitor should mask all the VIDs assigned to disk 2. The weight of disk 2 is set 0, which means disk 2 cannot receive any data from this moment. The weight of server 1 should be updated, i.e. decreased by the value of the weight of disk 2, so as to keep the equivalence with the sum of weights of all its child nodes, disk 0 and disk 1 shown in FIG. 11. Server 1 may need to mask VID if enough disks are removed when it reaches the weight threshold corresponding to one VID in the server layer. Suppose there is no need for server 1 to mask VID, the data may be constrained to migrate between all the existing disk(s) in server 1 and the disk(s) to be removed, that is the data may be migrated from disk 2 to disk 0 and/or disk 1 for storage load balance. If many disks are removed from server 1, it may need to mask some of its VIDs, because the hashing partition in the server layer may change, the data may be migrated from server 1 to other server(s) in the same layer (such as server 2 in the figure) as a result. In an exemplary embodiment of the present disclosure, the process of removing/decommissioning node(s) by the monitor node may include as follows.

(1) For each VID assigned to the node to be removed (shortly referred to as predecessor VID), the clockwise successor VID which belongs to another node (referred to as successor node) is searched in the same layer (shortly referred to as successor VID). Obviously, the predecessor VID is the predecessor node of the successor VID in hash space of the layer of both the node to be removed and the successor node.

(2) All the VGs in the VG-StorageNodes mapping table are traversed to find out the VG stored in the node to be removed and the hash value of which locates counterclockwise closest to predecessor VID in the hash space of corresponding layer. Those VGs should be moved to the successor node.

(3) For each VG, found in step (2), which should be moved to the successor node, the corresponding qualified nodes list are updated in the VG-StorageNodes mapping table, that is, replacing the predecessor node with the successor node in the qualified node list after the data in VG is migrated to the successor node.

Based on the aforesaid methods for data distribution, storage load balance and data recovery, the corresponding system can provide high availability and high reliability. The data storage services provided in an exemplary embodiment of the present disclosure will be presented below. The storage services can be considered as an abstract storage layer of the distributed storage system, offering access for clients to (store/retrieve data/object to/from) the storage system. In an exemplary embodiment of the present disclosure, a strong consistency is implemented, ensuring all identical operations on a specific object be performed in the same order on all notes. Identical operations on an object can be requested multiple times, but it may be executed only once due to the version control on object updating. The data consistency may be remained even in the event of a failure. From the perspective of a single client, the distributed storage system runs like only one storage node. The present disclosure can be modified by the person skilled in the art to make it have eventual consistency according to the principle adopted herein. The presented executions of reading, writing, updating, deleting object(s) are only basic operations on object(s), and can be extended by the person skilled in the art for practical deployment.

Object Reading/Writing/Updating/Deleting Process—A segment of a file (when adopting the policy of multiple repetitions) or a coded block of the segment (when adopting the policy of erasure coding or network coding) which exists in a client or a primary node is referred to as an object. Each block encoded from a segment of a file has the same object ID with its native file segment, and the ID of a block is obtained based on the position of s storage node in the VG qualified nodes list. Each file segment or coded block is stored as a single file in the storage node, and its file name may, but not limit to, include object ID, block ID, version number, etc.

Object writing step—Suppose a client wants to store a file to the storage system, the client may first divide the file into segments having a preset size SEGMENT_SIZE. When the size of the file is less than SEGMENT_SIZE, it needs to append zero(s) to the end, making the file occupy a full segment. The ID of the file segment (SEGMENT_ID) can be computed based on the file ID (FILE_ID) assigned to the file by such as a management server. In an exemplary embodiment of the present disclosure, the management node cluster maintains and manages the metadata of all files. A metadata storage may be implemented in the distributed memory database in an exemplary embodiment of the present disclosure. The ID of the file segment is computed according to its offset which is increased monotonically one by one from 0 to the file, the first segment of the file FILE_ID may have a file segment ID FILE_ID_0, the second segment of the file may have a file segment ID FILE_ID_1, and so on. According to the adopted data redundancy policy, such as multiple-repetitions, erasure coding or network coding, each file segment may be replicated or coded into a plurality of blocks and then stored in storage nodes by using two times of mapping. For multiple repetitions, the data of each block is identical to the file segment; for erasure coding or network coding, when using (K, M) coding scheme, the file segment is divided into K original data blocks which are encoded to generate M coded/parity blocks. All the blocks generated from a file segment are addressed by SEGMENT_ID in the storage system layer, and addressed by combining SEGMENT_ID and BLOCK_ID in the local file system of the storage nodes. Each block is called an object herein. For each file segment, (1) a client computing VG identity (VG_ID) by using hash function, that is the first mapping from segment/object to VG:

VG_ID=Hash(SEGMENT_ID)% VG_NUMBER₀

(2) the client retrieving the ID of the primary storage node for this VG from one of the management nodes, and the management maintaining the mapping from VG to its qualified storage nodes list. The selection of the management node can perform load balance by hash function:

Management_Node_Id=Hash(VG_ID)% MANAGEMENT_NODE_NUMBER₀

(3) the client sending the file segment/object to the primary node. The initial version of the object is 0.

(4) after receiving the file segment, the primary node seeking the VG_ID directory, checking whether an object having the same ID with the new coming segment already exists. If the object does not exist, the primary may reject request(s) and reply the current version of the object. If the object does not exist in the VG_ID directory, the primary node increases the current VG transaction ID by one, combines <TransactionID, VGVersion, ObjectOperationitem> to form a transaction, appends the new transaction to the submitted transaction list (STL), and increases the length of the STL by one. The OBJECT_OPERATION_ITEM may consist of, but not limit to, ObjectID, BlockID, ObjectVersion, VGVersion, ObjectOperationCode=WRITE, ObjectOperationOffset, ObjectOperationLength and ObjectOperationDataBuffer. The ObjectOperationCode may consist of, but not limit to, WRITE, READ, UPDATE, DELETE, etc. For writing operation, the ObjectOperationCode is WRITE. To accelerating a responding speed, STL may be stored in a medium with high performance such as the journal file of SSD. In a preferred embodiment of the present disclosure, STL may be implemented by using a journal tiering mechanism (described below).

(5) for each secondary node, the primary node modifying the BlockID of a transaction according to the position of corresponding secondary node in the VG qualified nodes list, and forwarding the modified transaction to corresponding secondary node by using a message mechanism, wherein the BlockID of the transaction may signify the position of the secondary node in the VG qualified nodes list. Each request from an object is referred to as a transaction which generally includes: transaction ID, virtual group ID, virtual group version, object ID, object version, object data and operation type.

(6) upon receiving the transaction/request message, each secondary node checking the VG version and its current VG version "CurrentVGVersion" in the transaction. If VGVersion<CurrentVGVersion, the request may be rejected; otherwise, the transaction is appended to the local submitted transaction table (STL) of this VG, and a success acknowledgement is sent to the primary node.

(7) after receiving success acknowledgement (of writing) from all secondary nodes, the primary node sending acknowledgement to the client to confirm that the requesting file segment has already been correctly stored in the storage system, and then persisting the file segment or its coded block to local disk asynchronously, which is referred to as committing (COMMIT). Concurrently, the primary node sends the request of COMMIT to all secondary nodes to make them persist their corresponding blocks.

(8) after last step, the transactions having been safely stored in the storage system, however, the object contained in each transaction may be not yet stored in its final destination i.e. the local file system. But for the client, the object has been successfully stored in the system.

Next the transaction committed mechanism (COMMIT) and the journal tiering mechanism referred in the object reading/updating/deleting process may be described.

The transaction committed mechanism may include a primary node process, a secondary node process and a replacement node process.

The primary node process may include as follows.

(1) The first uncommitted entry of the submitted transaction table (STL) for one VG of the primary node is obtained.

(2) The VGVersion of the transaction is fetched. If VGVersion equal the current version of the VG (CurrentVGVersion), after receiving all the acknowledgement from the secondary node, the primary node may store the object data of the transaction (ObjectOperationDataBuffer) to a file named "ObjectID.BlockID.ObjectVersion" in the local file system when the object of the transaction does not exist (i.e. object writing operation ObjectOperationCode==WRITE).

If the file corresponding to the object exists, the operation code of the transaction is updated (i.e. ObjectOperationCode==UPDATE), the version of the object equals to the current object version increased by one (i.e. ObjectVersion==CurrentObjectVersion+1), and the transaction is valid; otherwise an error is returned to the client and the transaction is rejected. If the objects corresponding to the transaction are data blocks (the file relative to the multiple-repetitions policy, or the uncoded part of native data relative to erasure coding/network coding), the data in the transaction will overwrite the data in the file at <OBJECT_OPERATION_OFFSET, OBJECT_OPERATIN_LENGTH>. If the objects corresponding to the transaction are coded blocks, the data in the transaction and the data in the current file within <ObjectOperationOffset, ObjectOperationLength> are needed to be merged (XOR operation). The file name corresponding to the transaction is modified as ObjectID.BlockID.ObjectVersion. The primary node masks the transaction as the state of committed (COMMITTED). The algorithm of the replacement node selection herein ensures that the primary node can obtain the acknowledgement correctly submitted by the transaction from all secondary nodes with high probability. If the primary node fails to get all the acknowledgement within a preset interval (COMMIT_TIMEOUT), the transaction may be invalid and marked as DESUBMITTED, and the DESUBMITTED message is sent to all secondary nodes to mark the transaction as DESUBMITTED. If the DESUBMITTED transaction is the last entry in the journal file, it will be deleted.

(3) From the process of the primary node selection, it is impossible to find a transaction having a version (VGVersion) bigger than the current VG version of the primary node (CurrentVGVersion). If VGVersion<CurrentVGVersion, the transaction is issued by the previous primary node. If the previous primary nodes do not replicate the transaction to all the secondary nodes, the current primary node may need to recover some blocks in secondary node. Based on the result of recovery, the primary node determines whether or not to continue the transaction or mark the transaction as DESUBMITTED.

(4) For the multiple-repetitions policy, the primary node sends a search transaction message (SEARCH_TRANSACTION) with a format <VGTransactionID, VGVersion, ObjectID, BlockID, ObjectVersion> to all the surviving secondary nodes. If all the secondary nodes contain this transaction, the primary node can commit this transaction safely, which is similar to step (2). If any secondary node does not have this transaction, the primary node may replicate the transaction again to corresponding missing secondary node, which should be done by previous primary node.

(5) For the erasure coding or network coding policy, the primary node sends a search transaction message (SEARCH_TRANSACTION) with a format <VGTransactionID, VGVersion, ObjectID, BlockID, ObjectVersion> to all the surviving secondary nodes. If all the secondary nodes contain this transaction, the primary node can commit the transaction safely, which is similar to step (2). If any secondary nodes does not have the transaction, when adopting erasure coding as the current redundancy policy, the primary node may try to regenerate (decode to repair) the original file segment and encode the segment again to regenerate failed/undistributed block(s); and when using network coding, the primary node may collect enough surviving blocks from surviving secondary nodes to regenerate the failed/distributed block (without recovering the whole segment); and after recovering the failed block the primary node may regenerate the transaction and forward again the transaction which should be done by previous primary to corresponding missing secondary node.

The processing of secondary node(s) may include as follows. Upon receiving the transaction committed request "CommitTransaction" with the format <TransactionID, VGVersion>, each secondary node may search the transaction "CommitTransaction" in the submitted transaction list (STL). When finding a transaction to be committed conforming both TransactionID and VGVersion, the secondary node may commit CommitTransaction (i.e. permanently store the object data of the transaction to the local file system).

The handling of the replacement node may be as follows. Upon receiving a transaction committed request with a transaction format<TransactionID, VGVersion>, the replacement node of the failed host node searches the transaction in the STL. If finding a transaction to be committed conforming both TransactionID and VGVersion, the replacement node needs not to commit the transaction but only to mark the transaction as COMMITTED. Once the replacement node becomes the primary node or secondary node, the transaction in STL may be committed during the recovering process of failed host node. When involving update transaction (UPDATA operation), the transaction object of the host node may need to merge with the recovered object of the replacement node.

If any failure occurs in the secondary node, the primary node may update the VG qualified nodes list from the management node. If the update is success, each failed secondary node may be replaced temporarily by a replacement node. The primary may retry the transaction to the new replacement node. After all nodes including the secondary node and its replacement nodes return the acknowledgement of successfully performing transaction, the primary node replies the client message about successful transaction. If the replacement node of the failed node cannot be queried in the management node, the primary node may repeat the querying process indefinitely, and the subsequent requests for this object from client may be all rejected.

Journal Tiering Mechanism—For low latency, especially for update operation, all the transactions are sequentially appended to the end of the submitted journal file in a storage medium with high performance such as SSD, that is the submitted transaction list is stored in high performance SSD, in a preferred embodiment of the present disclosure. SSD(s) is expensive and the capacity thereof is lower than HDD of comparable price. HDD is relatively cheaper with high capacity. Considering these differences, the transactions which are in the state of COMMITTED or DESUBMITTED are moved to the committed journal file persisted in HDD. Before moving a transaction entry in the submitted journal file from SSD to HDD, the object data is deleted and only the other items in the transaction are moved to the committed journal file. The transaction information in the committed journal file can be considered as the metadata of a target file which is stored in the same storage node. The committed journal file can be used to accelerate the recovery process when permanent failure happens. Because the committed journal file records all the committed transactions in VG, the replacement node of a permanent failed storage node can retrieve the committed journal file from current primary node or temporary primary node and get all the objects IDs that need to recovered; otherwise, the primary node or temporary primary node needs to scan all the files in the VG directory, which is time-consuming.

Committed Transaction List (CTL) Compaction—As described above, the main purpose of the CTL is (permanent) failure recovery. CTL contains all transaction information describing the historical operations on objects stored in the VG. Actually, only the latest operation information for each object in the VG is needed. So the CTL may be traversed, repetitive transaction entries of an identical object are deleted, and only the latest transaction determined by the transaction ID and the VG version is remained (i.e. the transaction having the largest VG version and largest transaction ID). The deletion of the repetitive data of an identical object transaction reduces the size of committed journal file, so it can record more object transactions with lower storage.

Object Read Process—The client always reads segment(s) from the primary storage node when no failure occurs in the primary storage node. For each segment, (1) VG_ID is computed by the client, using the first mapping to map object/segment ID to VG:

VG_ID=HASH(SEGMENT_ID)% VG_NUMBER.

(2) A management node is selected by means of hashing the VG_ID by the client:

Management_Node_Id=Hash(VG_ID)% MANAGEMENT_NODE_NUMBER (3) The primary node ID is obtained by the client from the management node which maintains the second mapping from VG to VG qualified storage nodes list.

(4) The read request is sent by the client to the primary node corresponding to this object.

(5) For erasure coding or network coding data protection scheme, the primary then collects K blocks of segment from local storage and K-1 surviving secondary nodes, and reconstructs the segment.

(6) The primary storage node sends the segment to the client.

If the primary node fails, the handling of the reading request may be transferred to the temporary primary node (TPN). For multiple-repetitions data protection policy, the TPN may retrieve the replicas of this object in local storage and reply the client immediately. For erasure coding or network coding, the TPN may collect K blocks from first K surviving secondary nodes in the VG qualified nodes list, reconstruct original object(s) and send the segment/object to the client. This reading process during failure is called degraded reading.

Object Update Process.

(1) Suppose the client wants to update an object at the position of OFFSET, the length of the updated part is LENGTH. The client may obtain the next version by adding the current version with one, that is, NewVersionClient=CurrentVersionClient+1.

(2) The client computes the mapping from object/segment ID to VG to obtain VG_ID:

VG_ID=HASH(SEGMENT_ID) % VG_NUMBER.

(3) The client selects one management node by hashing the VG_ID:

Management_Node_Id=Hash(VG_ID) % MANAGEMENT_NODE_NUMBER.

(4) The client obtains the primary node ID from the management node which maintains the second mapping from VG to VG qualified nodes list.

(5) The client sends the updated data part to the primary node corresponding to this object.

(6) The primary node obtains the current version of the updating object (CurrentVersionPrimary) from the file name containing ObjectVersion. If NewVersionClient<=CurrentVersionPrimary, the update request from the client is rejected.

(7) For multiple-repetitions data protection, the transaction ID of the VG is increased: VG_Transaction+1, the update of the transaction ID (TransactionID) is set: TransactionID=VG_Transaction, the transaction is packed: <TransactionID, VGVersion, ObjectOperationitem>, then the transaction is appended to the submitted transaction list (STL) and the length of the SSTL is increased by one. ObjectOperationitem may consist of, but not limit to, <ObjectID, BlockID, ObjectVersion=NewVersionPrimary, ObjectOperationCode=UPDATE, ObjectOperationOffset, ObjectOperationLength, ObjectOperationDataBuffer>, and forward the transaction to all secondary nodes with the BlockID set according to their positions in the qualified nodes list.

(8) Upon receiving the transaction, each secondary node appends the transaction with an identical rule the same as the object writing step, and replied acknowledge to the primary node if success.

(9) For erasure coding or network coding, the primary node obtains the old data of position and length <OFFSET, LENGTH> from local storage of other secondary nodes storing the updating part of this object, and computes incremental data (i.e. XORing old and new data):

Data_Delta=New_Data_at_OFFSET_LENGTH⊕Old_Data_at_OFFSET_LENGTH.

(10) The primary node computes the increment of a parity block (Parity_Delta) by considering each updated incremental data (Data_Delta) as a single segment/object according to scheme defined in erasure coding or network coding. The primary node packs Data_Delta to the transaction according to step (7) and appends the transaction to local STL or sends it to the secondary node which is responsible for this updating part. Then, the primary node packs the transaction of Parity_Delta and forwards it to its corresponding secondary nodes, which is similar to step (7). The process of the secondary node is similar to step (8).

(11) Upon receiving the acknowledgement of successfully performing transaction from all secondary nodes, the primary node commits the transaction and sends to all responsive secondary nodes with transaction committed request, including all secondary nodes storing Data_Delta and Parity_Deltas to perform the transaction committed request, and updates the object to permanently store in the local file system.

Note that, there exists difference in applying updated data when using multiple-repetitions or erasure coding/network coding protection scheme. When adopting multiple repetitions, the primary node and secondary node may overwrite old data by new updated data. When adopting erasure coding or network coding, the new updated data may overwrite the old data, and each new parity delta block is performed an XOR operation on corresponding old parity part of object.

Object Delete Process.

(1) The client increases the current version of the object by adding one to obtain a next version, i.e. NewVersionClient=CurrentVersionClient+1.

(2) The client computes the mapping from the object/segment ID to VG to obtain VG_ID:

VG_ID=HASH(SEGMENT_ID) % VG_NUMBER.

(3) The client selects a management node by hashing VG_ID:

Management_Node_Id=Hash(VG_ID) % MANAGEMENT_NODE_NUMBER.

(4) The client obtains the primary node ID from the management node which maintains the second mapping from VG to VG qualified nodes list.

(5) The client sends a DELETE request containing <ObjectID, DELETE> to its primary node.

(6) The primary node obtains the current version of the object to be deleted Current VersionPrimary. If NewVersionClient!=CurrentVersionPrimary+1, the deleting request from the client is rejected.

(7) Otherwise, the primary node increases the transaction ID of this VG: VG_TransactionID++, obtains the transaction ID of the deleting request: TransactionID=VG_TransactionID, appends the transaction<TransactionID, VGVersion, ObjectID, BlockID, ObjectVersion=NewVersionClient, DELETE> to the submitted transaction list (STL), and forwards the transaction to all secondary nodes with corresponding BlockID according to their positions in the qualified nodes list.

(8) Upon receiving the deleting transaction, each secondary node appends the transaction with the same rules of object writing step, and replies acknowledgement to the primary node if success.

(9) After receiving acknowledgement of successfully performing transactions from all the secondary nodes, the primary node commits the DELETE transaction and sends the transaction committed request to all the secondary nodes. For DELETE transaction, the primary node or secondary nodes may not often directly deleting object(s) in the local file system, but only mark the object(s) as DELETING, for example, appending the DELETING mark to the file name corresponding to the object. The real deleting operation is executed asynchronously in background processes according to a preset policy which for example is usually configured to delete object(s) permanently after a period of time.

Based on the basic object operations including object writing, reading, updating and deleting, a distributed file storage system which can provide basic file operations such as file writing, reading, updating and deleting can be constructed.

The principle and implementation manners present disclosure have been described above with reference to the specific examples, which are merely provided for the purpose of understanding the present disclosure and are not intended to limit the present disclosure. It will be possible for those skilled in the art to make variations, simple deductions, deformations or replacements based on the principle of the present disclosure.

The invention claimed is:

1. A distributed data storage system using multiple-layers consistent hashing, comprising:
a plurality of storage nodes providing data storage and redundancy protection, wherein the storage nodes form a storage hierarchical tree, and direct child nodes of a parent node share a same hash space;
a plurality of management nodes maintaining properties of the storage nodes and mapping information from virtual groups to storage nodes, wherein each of the virtual groups corresponds to a partition of hash space, that is, a hash subspace;
wherein the mapping information from virtual groups to storage nodes is based on hashing, and comprises:
mapping information from virtual groups to qualified storage nodes list; and
mapping information from virtual groups and a failed storage node to a replacement node of the failed storage node;
wherein the qualified storage nodes list comprises a primary node and one or more secondary nodes;
a plurality of monitor nodes maintaining states of the storage nodes and handling changes of states of the storage nodes including joining, decommissioning and failure, the monitor nodes retrieve state of the storage nodes in the qualified storage nodes list, and the primary node and a secondary node report a failure of each other to the monitor nodes; and
one or more clients providing entries for applications or users to access the storage system, wherein the client is used for initiating an access request of an object and searching the primary node corresponding to the object with a two-phase mapping, wherein a first mapping is mapping an object to a virtual group used as an object container, and a second mapping is mapping from a virtual group to a qualified nodes list, then realizes process of object access comprising:
an object writing step: the client uploading a new object to the storage system;
an object reading step: the client downloading an object from the storage system;
an object updating step: the client modifying an existed object in the storage system; and
an object deleting step: the client deleting an existed object in the storage system.

2. The system of claim 1, wherein properties of the storage nodes comprises: node identity, parent node identity, layer type, weight value of storage node capacity, virtual identity of node, identity of a host to which a node subordinates, identity of a rack to which a node subordinates, identity of a cluster to which a node subordinates, IP, Port and state of a node, wherein a number of virtual identity of node is assigned according to the weight value of storage node capacity.

3. The system of claim 1, wherein the storage hierarchical tree comprises a plurality of layers, each layer of the storage hierarchical tree is a parent layer of its direct child node, a weight of a parent node equal a sum of weights of all its direct child nodes.

4. The system of claim 1, wherein qualified storage nodes list of individual virtual group is generated in two ways:
selection of the primary node: selecting a node from a root node down to a leaf node in a cluster hierarchy in a manner of depth first search; and
selection of the secondary nodes: selecting the secondary nodes one by one from a root node down to a leaf node in a cluster hierarchy in a manner of depth first search with storage rules used as a pruning policy.

5. The system of claim 4, wherein the storage rules comprise:
a failure domain level defining a failure protection domain;
a storage policy defining a maximum number of replicas/blocks stored in each layer for a virtual group or an object; and
a load balance parameter defining system configuration used to select nodes.

6. The system of claim 1, wherein the storage nodes exchange their states through heartbeat messages in two manners, comprising:

considering a request forwarded from the primary node to the one or more secondary nodes as heartbeat when transmitting data; and using messages containing no object data from the primary node to the one or more secondary nodes as heartbeat when idle, the one or more secondary nodes sending replies to the primary node to claim their online states.

7. The system of claim 1, wherein the storage nodes cooperate with the monitor nodes to handle failure detection, and for each virtual group:

a primary node of a virtual group qualified nodes list reports to a monitor node with failure of a secondary node when it fails to receive acknowledgement from a secondary node within a preset timeout interval;

any secondary node of the virtual group qualified nodes list reports to the monitor node with failure of a primary node when it fails to receive request or heartbeat message from the primary node of the virtual group within a preset timeout interval;

the virtual group has a version with an initial value 0 and increased monotonously with one when state of a node in its qualified nodes list changes; and the monitor node can be selected by calculating HASH (identity of the virtual group) % (number of monitor nodes), where the % represents a remainder operation.

8. The system of claim 7, wherein processing of the monitor node handling failure recovery comprises:

selection of temporary primary node: using principle of committed transaction list or submitted transaction list invariance and principle of primary node invariance, wherein the principle of committed transaction list or submitted transaction list invariance ensures that a temporary primary node chosen has a longest committed transaction list or submitted transaction list among all surviving secondary nodes, and the principle of primary node invariance ensures that a primary node is always remained as the primary node of the virtual group as much as possible; and selection of replacement node: using locality affinity principle for selecting replacement node of the primary node of the virtual group or a secondary node of the virtual group, wherein the locality affinity principle ensures that a new chosen candidate is firstly selected in a same layer.

9. The system of claim 8, wherein if a failed node fails to rejoin a cluster within a preset time TEMPORARY_FAILURE_INTERVAL, the failed node is marked as a state of TEMPORARY_FAILURE;

if the monitor node still fails to receive rejoining message from the failed node after a time of PERMANENT_FAILURE_INTERVAL, the failed node is marked as a state of PERMANENT_FAILURE.

10. The system of claim 9, wherein the temporary failure is handled by a process of temporary failure recovery;

the permanent failure is handled by a process of permanent failure recovery;

the process of temporary failure recovery and the process of permanent failure recovery consist of a two-phase process including:

distributed hashing table recovery: making mapping from the virtual group to the qualified storage nodes list consistent with state changes of members of the storage nodes, this process comprising hashing table recoveries before data recovery and after data recovery; and data recovery: moving data to its destination according to recovered mapping information from the virtual group to qualified storage nodes.

11. The system of claim 10, wherein process of the hashing table recoveries before data recovery comprises:

the monitor node traversing a virtual group-storage nodes mapping table to find a virtual group having the failed node in the qualified storage nodes list; and for each virtual group, inserting <virtual group identity, failed node identity, replacement node identity> into virtual group-storage nodes mapping table, where the < > represents an entry including contents in the < >.

12. The system of claim 10, wherein the process of the hashing table recoveries after data recovery comprises:

traversing the virtual group-storage nodes mapping table to find all virtual groups having the failed node in the qualified storage nodes list;

for each virtual group, traversing the virtual group-storage nodes mapping table to find unique online replacement node of the failed node;

for each virtual group, replacing the failed node in the virtual group qualified nodes list with the online replacement node; and after data recovery, deleting entry <virtual group identity, failed node identity, replacement node identity> from a virtual group-replacement node table, where the < > represents an entry including contents in the < >.

13. The system of claim 10, wherein the primary node or a temporary primary node of each virtual group coordinates data recovery comprising:

for a new joined node after failure, no need to recover when there exists no replacement node;

for a new joined node after failure, when there exists a replacement node and one of which is online, copying the submitted transaction list and the committed transaction list from a corresponding replacement node to a rejoined node; and for a node in permanent failure state, its replacement node takes over position of the failed node in a virtual group storage nodes list and obtains committed transaction list from the primary node.

14. The system of claim 1, wherein joining of the storage nodes is handled by process of adding node comprising:

for each virtual identity assigned to a new added node i.e. a predecessor node, finding virtual identity belongs to another successor node in a clockwise direction in a same layer;

traversing all virtual groups in a virtual group-storage nodes mapping table to search for virtual groups which are stored in the another successor node and its hash value is equal to a hash value of the virtual identity of the predecessor node, comparing with the virtual identity of the another successor node, wherein these found virtual groups should be moved to the new added node Le, predecessor node; and for each virtual group which should be moved to the predecessor node, updating qualified nodes list corresponding to the virtual group in the virtual group-storage nodes mapping table, that is replacing the successor node in the qualified nodes list with the predecessor node after moving data in the virtual group to the predecessor node.

15. The system of claim 1, wherein removing or decommissioning of the storage nodes is handled by process of removing/decommissioning node comprising:

for each virtual identity assigned to a node to be removed i.e. predecessor node, searching a virtual identity belongs to another node i.e. successor node in a clockwise direction in a same layer;
traversing all virtual groups in a virtual group-storage nodes mapping table to search for virtual groups stored in the predecessor node, wherein these virtual groups are moved to the successor node; and
for each virtual group moved to the successor node, updating the qualified nodes list corresponding to the virtual group in the virtual group-storage nodes mapping table, that is, replacing the predecessor node in the qualified nodes list with the successor node after data in the virtual group is moved to the successor node.

16. The system of claim 1, wherein the object writing step comprises:
(1) the client computing virtual group identity with hash function and object identity;
(2) the client retrieving primary node identity of the virtual group from one of the management nodes;
(3) the client sending file segment or object to the primary node, wherein an initial version of the object is 0;
(4) the primary node checking existent of the object upon receiving the object, then rejecting such request when the object exists, or creating a transaction and appending a new transaction to submitted transaction list when the object does not exist;
(5) for each secondary node, the primary node modifying fast index BlockID of the transaction according to position of corresponding secondary node in qualified storage nodes list and forwarding modified transaction to corresponding secondary node;
(6) each secondary node checking consistency of virtual group version upon receiving transaction or request message, then rejecting a transaction request when virtual group version of object in the transaction is less than current virtual group version to which the transaction object is mapped, or else appending the transaction to local submitted transaction list and sending to the primary node with a success message about transaction execution; and
(7) the primary node sending acknowledgement to the client upon receiving success message from all secondary nodes to confirm that a requesting object has already been correctly stored in the storage system, then storing the object as a single file to local file system asynchronously and appending the transaction to committed transaction list; concurrently, the primary node sending the committed transaction list to all secondary nodes to enable the secondary nodes to store the object to its local file system with persistence and also appending transaction to its committed transaction list.

17. The system of claim 1, wherein the object reading step comprises:
(1) the client computing virtual group identity with hash function and object identity;
(2) the client selecting one management node by means of computing hash value of virtual group identity;
(3) the client obtaining primary node identity from the management node;
(4) the client sending read request to the primary node corresponding to the object;
(5) the primary node collecting K data blocks or coded blocks of the object from local file system and K-1 surviving secondary nodes and reconstructing the object for erasure coding or network coding protection scheme; and the primary node obtaining replica of the object from local storage for multiple-repetitions scheme; and
(6) the primary node sending the object to the client.

18. The system of claim 1, wherein the object updating step comprises:
(1) the client computing next version of the object, i.e. current version plus one;
(2) the client computing virtual group identity by using hash function and object identity;
(3) the client selecting one management node by hashing the virtual group identity;
(4) the client obtaining the primary node identity from the management node;
(5) the client sending updated data to the primary node corresponding to the object;
(6) the primary node obtaining current version of the object to be updated from file name and then rejecting updating request when new version is less than or equal to the current version;
(7) otherwise, the primary node increasing transaction index of virtual group VG_Transaction for scheme of multiple repetitions data protection, forming a new transaction containing the update, appending the new transaction to submitted transaction list and forwarding the new transaction to all secondary nodes;
(8) upon receiving the new transaction, each secondary node appending the new transaction to submitted transaction list, and replying a success message about transaction execution to the primary node if the appending is done successfully;
(9) for erasure coding or network coding, the primary node obtaining old data from local storage or one of other secondary nodes and computing increment of an update Data_Delta by XORing old data and new data;
(10) the primary node computing increment of parity blocks by considering each updated data increment Data_Delta as a single segment or object according to scheme defined in erasure coding or network coding algorithm, the primary node enabling transaction containing Data_Delta to append to local submitted transaction list or sending the new transaction to secondary nodes, then the primary node creating and forwarding the new transaction containing increment of parity block Parity_Delta to its corresponding secondary node which is handled in a same way of step (8); and
(11) upon receiving success message about transaction execution from all secondary nodes, the primary node replying acknowledgement of success execution to update transaction to the client, then the primary node committing transaction asynchronously or sending transaction submitted request to secondary nodes corresponding to updating increment, wherein the secondary nodes include secondary nodes storing Data_Delta and all secondary nodes storing Parity_Delta.

19. The system of claim 1, wherein the object deleting step comprises:
(1) the client computing next version of the object, i.e. current version plus one;
(2) the client computing virtual group identity by using hash function and object identity;
(3) the client selecting one management node by hashing the virtual group identity;
(4) the client obtaining primary node identity from the management node;

(5) the client sending a deleting request DELETE containing <object identity, DELETE> to the primary node, where the < > represents an entry including contents in the < >;
(6) the primary node obtaining current version of object to be deleted, and rejecting deleting request when new version of the object in the deleting request is not equal to current version plus one;
(7) otherwise the primary node increasing transaction index of virtual group, appending the a transaction DELETE to submitted transaction list, and forwarding the transaction to all secondary nodes corresponding to BlockID according to its position in qualified nodes list;
(8) upon receiving the transaction, each secondary node appending the transaction, and replying a success message about transaction execution to the primary node if the appending is done successfully; and
(9) upon receiving the success message about transaction execution from all secondary nodes, the primary node committing the transaction DELETE and sending the transaction committing request to all secondary nodes, the primary node or the secondary node does not directly deleting the object in local file system for a committed transaction DELETE, but only marking the object as DELETING, real operation of deleting being executed according to a preset policy which delete object permanently after a preset interval, and the deleting operation being executed asynchronously in background processes.

\* \* \* \* \*